(12) United States Patent
Lee et al.

(10) Patent No.: US 7,333,549 B2
(45) Date of Patent: Feb. 19, 2008

(54) METHOD AND APPARATUS FOR ESTIMATING A SIGNAL SEQUENCE IN A MIMO-OFDM MOBILE COMMUNICATION SYSTEM

(75) Inventors: Jong-Ho Lee, Seoul (KR); Jae-Hak Chung, Seoul (JP); Chan-Soo Hwang, Yongin-shi (KR); Seung-Hoon Nam, Seoul (KR); Do-Young Kwak, Seoul (KR); Jae-Choong Han, Suwon-shi (KR); Seong-Cheol Kim, Seoul (KR)

(73) Assignees: Samsung Electronics Co., Ltd. (KR); Seoul National University Industry Foundation (KR)

( * ) Notice: Subject to any disclaimer, the term of this patent is extended or adjusted under 35 U.S.C. 154(b) by 809 days.

(21) Appl. No.: 10/756,073

(22) Filed: Jan. 12, 2004

(65) Prior Publication Data

US 2004/0208254 A1 Oct. 21, 2004

(30) Foreign Application Priority Data

Apr. 21, 2003 (KR) ...................... 10-2003-0025146

(51) Int. Cl.
*H04L 27/28* (2006.01)
(52) U.S. Cl. ....................................... 375/260
(58) Field of Classification Search ................ 375/260, 375/259, 316, 320, 324, 322, 329, 340, 377, 375/261, 262, 224, 227, 228; 700/28, 53
See application file for complete search history.

(56) References Cited

U.S. PATENT DOCUMENTS 7,173,972 B2* 2/2007 Thomson et al. ........... 375/260

* cited by examiner

*Primary Examiner*—Pankaj Kumar
(74) *Attorney, Agent, or Firm*—The Farrell Law Firm, PC

(57) ABSTRACT

A apparatus and method for estimating a sequence of transmitted quadrature amplitude modulation (QAM)-modulated signals and space-time block coded signals using an optimal expectation-maximization (EM)-based iterative estimation algorithm in a multiple-input and multiple-output (MIMO)-orthogonal frequency division multiplexing (OFDM) mobile communication system. An initial sequence estimation value is produced on the basis of a predetermined initial value using a pilot sub-carrier contained in each of OFDM signals received by a receiving side. A normalized value of a received signal on a channel-by-channel basis is produced by a predetermined equation using orthogonality between the OFDM signals received by the receiving side. At least one subsequent sequence estimation value is produced using the initial sequence estimation value and the normalized value of the received signal on the channel-by-channel basis. If the subsequent sequence estimation value converges to a constant value after an operation of producing the subsequent sequence estimation value is iterated the predetermined number of times, the converged subsequent sequence estimation value is designated as a final sequence estimation value.

36 Claims, 14 Drawing Sheets

BER PERFORMANCE WHEN SPACE-TIME BLOCK CODE
BASED ON RATE 1 FOR TWO TRANSMITTING ANTENNAS
AND ONE RECEIVING ANTENNA IS USED
(16-QAM, fdTs=0.005)

BER PERFORMANCE WHEN SPACE-TIME BLOCK CODE
BASED ON RATE 3/4 FOR THREE TRANSMITTING ANTENNAS
AND ONE RECEIVING ANTENNA IS USED
(16-QAM, fdTs=0.005)

BER PERFORMANCE WHEN SPACE-TIME BLOCK CODE
BASED ON RATE 3/4 FOR FOUR TRANSMITTING ANTENNAS
AND ONE RECEIVING ANTENNA IS USED
(16-QAM, fdTs=0.005)

METHOD AND APPARATUS FOR ESTIMATING A SIGNAL SEQUENCE IN A MIMO-OFDM MOBILE COMMUNICATION SYSTEM

PRIORITY

This application claims priority to an application entitled "METHOD AND APPARATUS FOR ESTIMATING SIGNAL SEQUENCE IN MIMO-OFDM MOBILE COMMUNICATION SYSTEM", filed in the Korean Industrial Property Office on Apr. 21, 2003 and assigned Serial No. 2003-25146, the contents of which are hereby incorporated by reference.

BACKGROUND OF THE INVENTION

1. Field of the Invention

The present invention relates generally to a mobile communication system based on an orthogonal frequency division multiplexing (OFDM), and more particularly to a method for estimating sequences of OFDM signals transmitted after quadrature amplitude modulation (QAM) and space-time block code (STBC) encoding operations are performed.

2. Description of the Related Art

It is difficult for 3G code division multiple access (CDMA) mobile communication systems to process large-capacity radio data. To overcome this difficulty, 4G orthogonal frequency division multiplexing (OFDM) mobile communication systems capable of processing large-capacity data on a multipath channel at a high speed have been proposed.

Conventionally, when data is transmitted over an orthogonal frequency division multiplexing (OFDM) system, sub-carriers carry symbols and then sub-channels combined with the sub-carriers are transmitted. Because spectrums of the sub-channels in the OFDM system can maintain the orthogonality with each other, and overlap each other, the efficiency of the spectrums is good. Because OFDM modulation and demodulation are implemented by an inverse Fourier fast transform (IFFT) and fast Fourier transform (FFT), a modulator/demodulator can be efficiently digitalized. Further, the OFDM system can efficiently operate in a current European digital broadcasting system, not affected by frequency-selective fading or narrow-band interference environments, and can also operate in a high-speed data transmission system based on standards of large-capacity wireless communication systems adopted by IEEE 802.11a, IEEE 802.16a, IEEE 802.16b, etc. Further, as the demand for broadband wireless communications increases in 4G mobile communication systems, research is currently being carried out on multiple-input and multiple-output (MIMO) systems using multiple antennas when transmitting and receiving operations are ongoing. In the MIMO systems, a decoding process uses a space-time block code (STBC), which is relatively uncomplicated.

FIG. 1 is a schematic diagram illustrating a conventional MIMO-OFDM transmission system. Referring to FIG. 1, data symbols to be transmitted by a transmitting side are modulated by a modulator (not shown). At this time, typical modulation schemes include quadrature phase shift keying (QPSK), 16-quadrature amplitude modulation (QAM), 64-QAM, etc. The above-described modulated symbols are input into an STBC encoder 110. The STBC encoder 110 carries out a space-time block encoding operation for the input modulated symbols. Then, outputs of the STBC encoder 110 are input into inverse Fourier fast transform (IFFT) processors 120, 121, . . . , 122. The IFFT processors 120, 121, . . . , 122 convert the outputs of the STBC encoder 110 into OFDM signals according to IFFT operations. Finally, the OFDM signals are transmitted through a plurality of transmitting antennas 130, 131, . . . , 132.

FIG. 2 is a schematic diagram illustrating a conventional MIMO-OFDM reception system. Referring to FIG. 2, a plurality of receiving antennas 201, 202, . . . , 203 receive OFDM signals. FFT processors 210, 211, . . . , 212 perform Fourier fast transform (FFT) operations for the received OFDM signals to generate FFT operation signals. A pilot detection and initial value estimation unit 220 produces an initial sequence estimation value using a pilot sub-carrier contained in each of the OFDM signals detected from the FFT operation signals and a predetermined initial value. Outputs of the pilot detection and initial value estimation unit 220 and FFT processors 210, 211, . . . , 212 are input into an STBC decoder 230. The STBC decoder 230 determines an optimum received signal and performs a space-time block decoding operation.

Methods for estimating the channel of a received signal in the OFDM system may include a deterministic maximum likelihood (ML) estimation method, a minimum mean square error (MMSE) estimation method, etc.

It is assumed that a channel impulse response is unknown but can be determined (not random) using the deterministic ML estimation method. The deterministic ML estimation method estimates the channel by obtaining an estimation value of the optimum ML. However, the deterministic ML estimation method has a problem in that the accuracy of estimation is degraded because statistical channel information is not used when the channel of a received signal is estimated. It is assumed that the channel impulse response is random in the MMSE estimation method. The MMSE estimation method estimates the channel such that the square of a channel estimation error value can be minimized. However, the MMSE estimation method has a problem in that it is difficult for the MMSE estimation method to be implemented in an actual system because statistical data associated with channel characteristics, signal-to-noise ratio (SNR) data, etc. are needed so that the channel of the received signal can be estimated.

As a result, the receiving side of the conventional MIMO-OFDM system needs an improved channel estimation method capable of compensating for the distortion of a signal due to multipath fading such that a QAM-modulated and space-time block coded signal can be appropriately detected.

SUMMARY OF THE INVENTION

Accordingly, the present invention has been designed in view of the above and other problems, and it is an object of the present invention to provide a method based on an optimal expectation-maximization (EM)-based iterative estimation algorithm for compensating for the distortion of a signal due to multipath fading when a receiving side of a multiple-input and multiple-output (MIMO)-orthogonal frequency division multiplexing (OFDM) system appropriately detects a transmitted quadrature amplitude modulation (QAM)-modulated and space-time block coded signal.

It is another object of the present invention to provide a method capable of estimating a signal sequence without producing an inverse matrix associated with a sequence estimation value at each iteration time by employing a normalized value of a received signal on a channel-bychannel basis when the signal sequence is estimated on a basis of an expectation-maximization (EM)-based iterative estimation algorithm.

In accordance with an aspect of the present invention, the above and other objects can be accomplished by a method for estimating a sequence of transmitted quadrature amplitude modulation (QAM)-modulated and space-time block coded signals using an optimal expectation-maximization (EM)-based iterative estimation algorithm in a multiple-input and multiple-output (MIMO)-orthogonal frequency division multiplexing (OFDM) mobile communication system, comprising the steps of (a) producing an initial sequence estimation value according to a predetermined initial value using a pilot sub-carrier contained in each of OFDM signals received by a receiving side; (b) producing a normalized value of a received signal on a channel-by-channel basis using orthogonality between the OFDM signals received by the receiving side and a predetermined equation; (c) producing at least one subsequent sequence estimation value using the initial sequence estimation value and the normalized value of the received signal on the channel-by-channel basis; and (d) if the at least one subsequent sequence estimation value converges to a constant value after producing the subsequent sequence estimation value is iterated a predetermined number of times, determining the converged subsequent sequence estimation value to be a final sequence estimation value.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
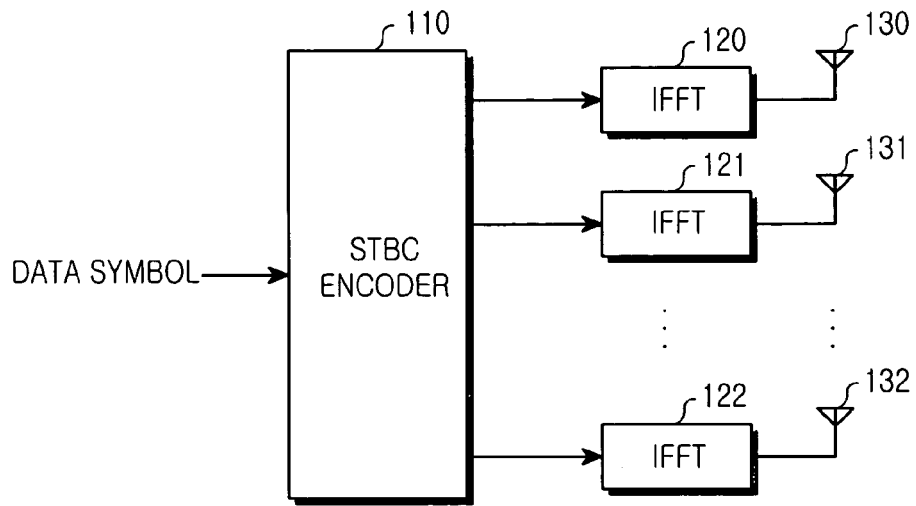
FIG. 1 is a schematic diagram illustrating a conventional multiple-input and multiple-output (MIMO)-orthogonal frequency division multiplexing (OFDM) transmission system.
Figure 2:
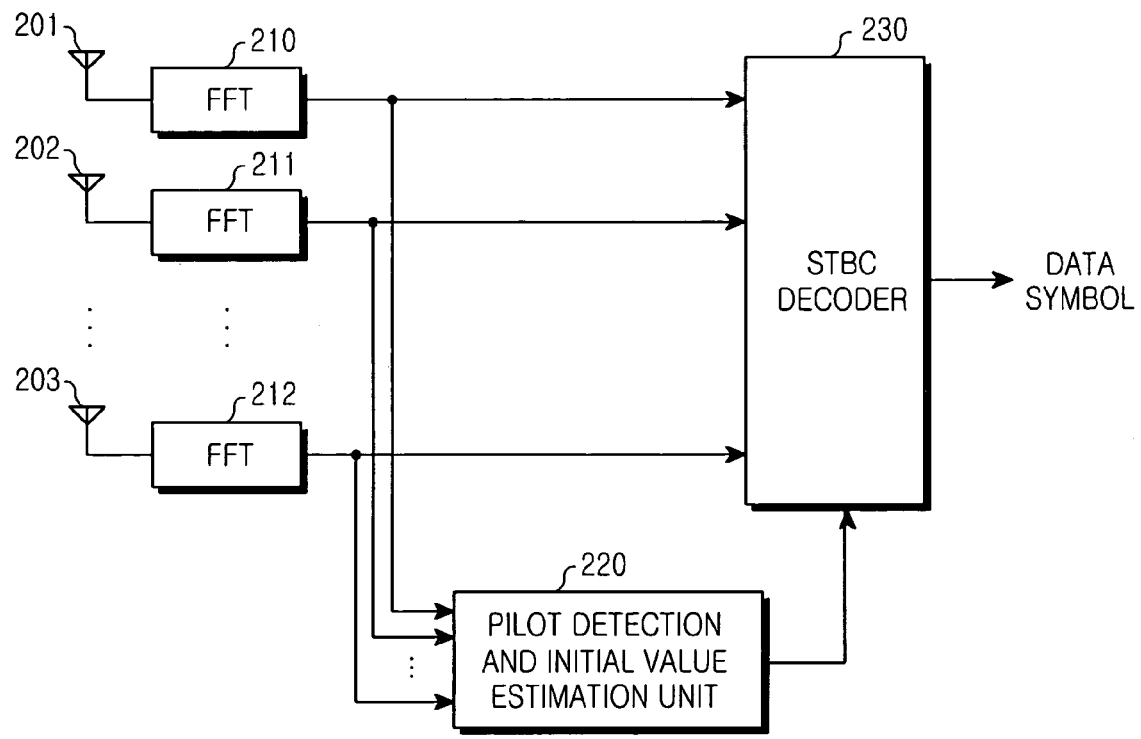
FIG. 2 is a schematic diagram illustrating a conventional MIMO-OFDM reception system.

Preferred embodiments of the present invention will be described in detail herein below with reference to the annexed drawings. In the drawings, the same or similar elements are denoted by the same reference numerals even though they are depicted in different drawings. In the following description made in conjunction with preferred embodiments of the present invention, a variety of specific elements such as concrete circuits are illustrated. The description of such elements has been made only for a better understanding of the present invention. Those skilled in the art will appreciate that the present invention can be implemented without using the above-described specific elements. Also, in the following description, a detailed description of known functions and configurations incorporated herein will be omitted when it may make the subject matter of the present invention rather unclear.

First Embodiment

The first embodiment of the present invention uses an optimal expectation-maximization (EM)-based iterative estimation algorithm to compensate for distortion of a signal caused by multi-path fading when a receiving side of a multiple-input and multiple-output (MIMO)-orthogonal frequency division multiplexing (OFDM) mobile communication system in accordance with the first embodiment of the present invention (FIG. 3) estimates a sequence of transmitted quadrature amplitude modulation (QAM)-modulated signals and space-time block coded signals. The present invention proposes a method for estimating a signal sequence without producing an inverse matrix associated with a sequence estimation value at each iteration time by employing a normalized value of a received signal on a channel-by-channel basis when the signal sequence is estimated using the EM-based iterative estimation algorithm.

Before the first embodiment of the present invention is described in detail, a method for estimating the signal sequence using an EM-based iterative estimation algorithm for transmitted QAM-modulated signals and space-time block coded signals in the receiving side of the MIMO-OFDM mobile communication system will be described.

First, a number of transmitting antennas is "N", a number of receiving antennas is "M", a length of a code word is "L", and a number of sub-carriers for OFDM signals is "$N_s$". Further, a number of sub-carriers to be used for modulation is $$P = 2N_\alpha + 1 \left( N_\alpha = \text{int}\left[\frac{N(1-\alpha)}{2}\right] \right)$$

where "int[·]" denotes an integer part of a result of the operation within the bracket. Furthermore, a $p^{th}$ transmission data symbol vector is given by $s_p = [s_p(-N_\alpha), \ldots s_p(-1), s_p(0), s_p(1), \ldots s_p(N_\alpha)]^T$ where "$[\cdot]^T$" denotes a vector transpose operation. Space-time block coding associated with the $p^{th}$ transmission data symbol vector can be represented by Equation 1.

$$C_p = \begin{bmatrix} c_1^p(1) & c_2^p(1) & \cdots & c_N^p(1) \\ c_1^p(2) & c_2^p(2) & \cdots & c_N^p(2) \\ & & \cdots & \\ c_1^p(L) & c_2^p(L) & \cdots & c_N^p(L) \end{bmatrix} \quad \text{Equation 1}$$

In Equation 1 above, "$c_n^p(l)$" denotes an $l^{th}$ symbol of a $p^{th}$ code word transmitted by an $n^{th}$ transmitting antenna.

Transmission data symbol vectors $s_1, s_2, \ldots, s_p$ to be contained in a space-time block coded OFDM word are encoded to STBCs $C_1, C_2, \ldots, C_p$, and each code word is modulated on each sub-carrier. If this is done, a symbol $D_n(l)$ to be contained in an $l^{th}$ OFDM signal transmitted by an $n^{th}$ transmitting antenna is given by Equation 2.

$$D_n(l) = \text{diag}[c_n^1(l), c_n^2(l), \ldots, c_n^P(l)] \quad \text{Equation 2}$$

Thus, an $l^{th}$ received signal $y_m(l) = [y_m^1(l), y_m^2(l), \ldots, y_m^P(l)]^T$ from an $m^{th}$ receiving antenna is expressed as in Equation 3.

$$y_m(l) = \sum_{n=1}^{N} D_n(l) H_{n,m}(l) + n_m(l) \quad \text{Equation 3}$$

In Equation 3 above, "$D_n(l)$" denotes a symbol contained in an OFDM signal transmitted from the $n^{th}$ transmitting antenna "$n_m(l)$" denotes an additive white Gaussian noise (AWGN) vector and an average of vectors is zero. "$n_m(l)$" is associated with a covariance matrix of "$\sigma_n^2 I$" where "$\sigma_n^2$" denotes a noise variable and "I" denotes an identity matrix. $H_{n,m}(l) = [H_{n,m}^1(l), H_{n,m}^2(l), \ldots, H_{n,m}^P(l)]^T$ denotes a frequency response associated with a channel from the $n^{th}$ transmitting antenna to the $m^{th}$ receiving antenna, and is expressed in Equation 4.

$$H_{n,m}(l) = F h_{n,m}(l) = [f^1 f^2 \ldots f^P]^T h_{n,m}(l) \quad \text{Equation 4}$$

In Equation 4, $h_{n,m}(l) = [h_{n,m}^1(l) h_{n,m}^2(l) \ldots h_{n,m}^J(l)]^T$ denotes an impulse response associated with the channel from the $n^{th}$ transmitting antenna to the $m^{th}$ receiving antenna. It is assumed that $h_{n,m}(l)$ elements have independent Rayleigh fading factors. Further, "F" denotes a discrete Fourier transform matrix whose elements are expressed as in Equation 5.

$$[f^p]_a = \exp\left(-j\frac{2\pi p'(a-1)}{N_s}\right),$$
$$p = 1, 2, \cdots, P \quad a = 1, 2, \cdots, J \quad \text{Equation 5}$$

In Equation 5, "P" denotes the number of sub-carriers, and "J" denotes the number of channel impulse response paths. Further, a sub-carrier index $p' = p - N_\alpha - 1$, and it is satisfied that $|p'| \leq N_\alpha$.

In the above case, channel fading is constant with respect to OFDM space-time code words. In other words, a channel is in quasi-static state when Equation 6 is satisfied.

$$H_{n,m}(1) = H_{n,m}(2) = \ldots = H_{n,m}(L) = H_{n,m} \quad \text{Equation 6}$$

If Equation 6 is satisfied, Equation 3 can be expressed as in Equation 7.

$$y_m = \sum_{n=1}^{N} D_n H_{n,m} + n_m \quad \text{Equation 7}$$

In Equation 7, $y_m = [y_m^T(1) \, y_m^T(2) \ldots, y_m^T(L)]^T$ and $n_m = [n_m^T(1) \, n_m^T(2) \ldots, n_m^T(L)]^T$.

In order for the EM-based iterative channel estimation algorithm to be applied to received signals, Equation 7 can be expressed as in Equations 8 and 9.

$$y_m = D_m \bar{F} h_m + n_m \quad \text{Equation 8}$$

$$\bar{F} = \begin{bmatrix} F & 0 & \cdots & 0 \\ 0 & F & \cdots & 0 \\ & & \cdots & \\ 0 & 0 & \cdots & F \end{bmatrix}, \quad h_m = [h_{1,m}^T h_{2,m}^T \cdots, h_{N,m}^T]^T,$$

$$\text{and } D = \begin{bmatrix} D_1(1) & D_2(1) & \cdots & D_N(1) \\ D_1(2) & D_2(2) & \cdots & D_N(2) \\ & & \cdots & \\ D_1(L) & D_2(L) & \cdots & D_N(L) \end{bmatrix} \quad \text{Equation 9}$$

The signal sequence received by the receiving side of the MIMO-OFDM mobile communication system is estimated by the EM-based iterative estimation algorithm as follows.

First, an iterated initial value, i.e., an initial sequence estimation value $\hat{s}^0$, is produced according to a predetermined initial value using a pilot sub-carrier contained in each OFDM symbol at an initial estimation step. The predetermined initial value can be a minimum mean square error (MMSE) estimation value or deterministic maximum likelihood (ML) estimation value.

Next, a likelihood function as shown in Equation 10 is produced at an expectation step.

$$L(s|\hat{s}^i) = \sum_{m=1}^{M} \left\{ \text{Re}[y_m^H D \bar{F} \mu_m^i] - \frac{1}{2} \sum_{a=1}^{NJ} \sum_{b=1}^{NJ} [(D\bar{F})^H D\bar{F}]_{a,b} [x_m^i]_{a,b} \right\} \quad \text{Equation 10}$$

In Equation 10, "$s=[s_1^T, s_2^T, \ldots, s_P^T]^T$" denotes a data symbol vector contained in one STBC-OFDM codeword and "$\mu_m^i$" denotes a conditional expected value for a channel impulse response where a received signal $y_m$ and an $i^{th}$ sequence estimation value $\hat{s}^i$ are given, and is expressed as in Equation 11.

$$\mu_m^i = E[h_m | y_m, \hat{s}^i] = K_m^i \overline{F}^H (\hat{D}^i)^H y_m \qquad \text{Equation 11}$$

In Equation 11, the notation $(\cdot)^H$ denotes a Hermitian transpose operation, and the notation "$E[\cdot]$" denotes an operation for computing an average value (or expected value). Further, "$\hat{D}^i$" denotes a matrix defined as in the above Equations 2 and 9 using the $i^{th}$ sequence estimation value. Further, "$K_m^i$" denotes a normalized value of the channel impulse response, and is expressed as in Equation 12 where a covariance matrix of the channel impulse response is given by $R_m = E[h_m h_m^H]$.

$$K_m^i = (\sigma_n^2 R_m^{-1} + \overline{F}^H (\hat{D}^i)^H \hat{D}^i \overline{F})^{-1} \qquad \text{Equation 12}$$

In Equation 10, "$x_m^i$" denotes a conditional expected value of the covariance matrix of the channel impulse response where the received signal $y_m$ and the $i^{th}$ sequence estimation value $\hat{s}^i$ are given, and is expressed as in Equation 13.

$$x_m^i = E[h_m h_m^H | y_m, \hat{s}^i] = \sigma_n^2 K_m^i + \mu_m^i (\mu_m^i)^H \qquad \text{Equation 13}$$

Next, a $(i+1)^{th}$ sequence estimation value, i.e., a subsequent sequence estimation value, is produced by Equation 14 at a maximization step.

$$\hat{s}^{i+1} = \arg\max_s L(s | \hat{s}^i) \qquad \text{Equation 14}$$

The procedure for producing the subsequent sequence estimation value is repeated until the sequence estimation value converges to a constant value.

If the sequence estimation value converges according to the above-described procedure, the converged value is determined to be a final sequence estimation value, and then a data symbol is determined according to the final sequence estimation value by STBC decoding.

When the signal sequence is estimated by the receiving side of the MIMO-OFDM mobile communication system using the conventional EM-based iterative estimation algorithm, $(\hat{D}^i)^H \hat{D}^i$ is previously produced and the previously produced $(\hat{D}^i)^H \hat{D}^i$ value is used for producing the conditional expected value $\mu_m^i$ of the channel impulse response, because $(\hat{D}^i)^H \hat{D}^i$ contained in an inverse matrix of Equation 12 associated with the normalized value $K_m^i$ of the channel impulse response has a constant value in spite of an i order where phase shift keying (PSK) modulation having constant envelope characteristics is used.

However, where the QAM having the high frequency efficiency is used, the above-described inverse matrix must be produced every time the subsequent sequence estimation value is produced because $(\hat{D}^i)^H \hat{D}^i$ contained in an inverse matrix of the normalized value $K_m^i$ of the channel impulse response in Equation 12 is a function of the $i^{th}$ sequence estimation value. When the procedure for producing the inverse matrix is implemented on the system, the system becomes unstable. In other words, it is impossible to implement the procedure for producing the inverse matrix on the system.

Thus, the present invention provides a new method for estimating the signal sequence using the EM-based iterative estimation algorithm without producing the inverse matrix associated with the $i^{th}$ sequence estimation value when the QAM is used.

Figure 3:
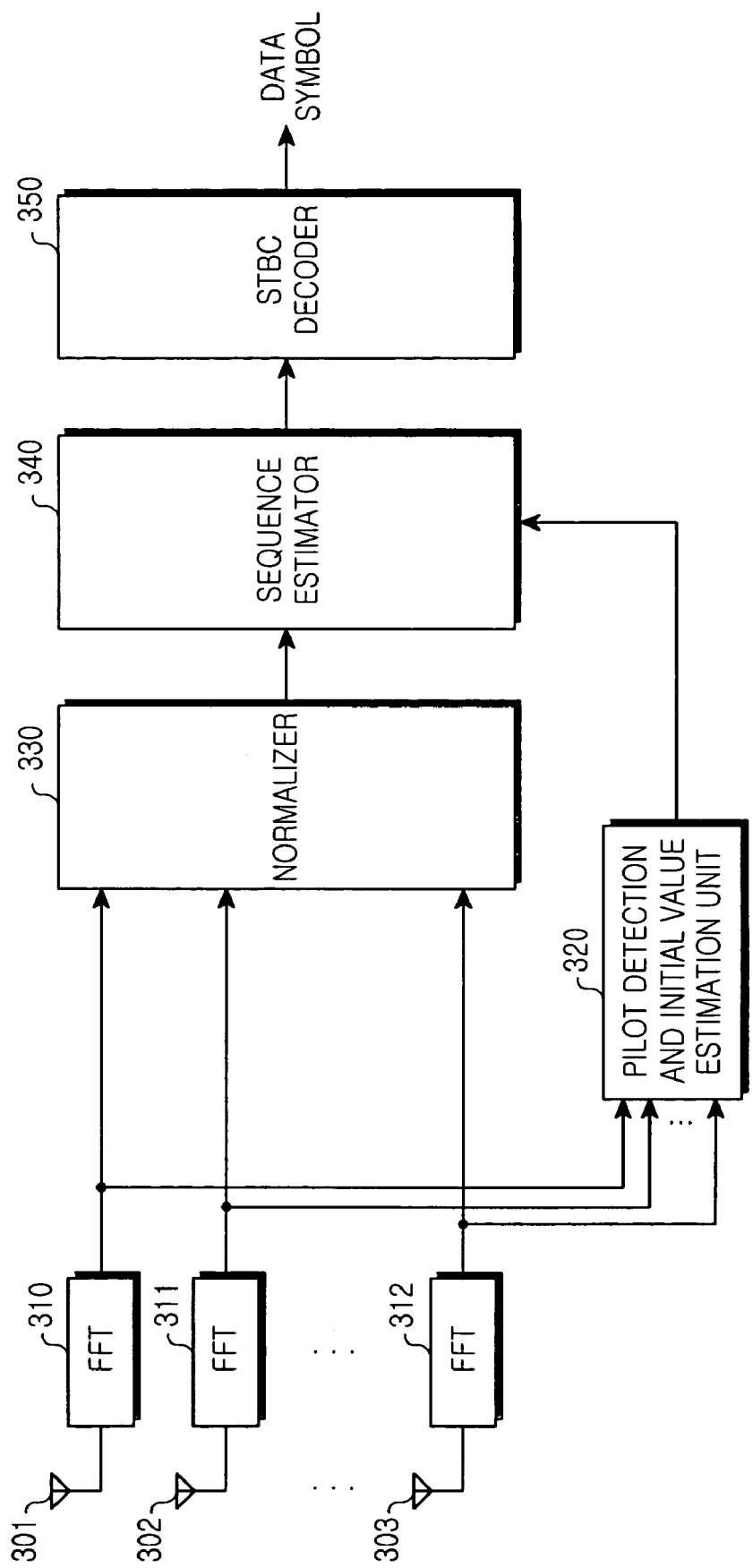
FIG. 3 is a schematic diagram illustrating a MIMO-OFDM reception system in accordance with a first embodiment of the present invention.

FIG. 3 is a schematic diagram illustrating a MIMO-OFDM reception system in accordance with the first embodiment of the present invention. Referring to FIG. 3, Fourier fast transform (FFT) processors 310, 311, ..., 312 carry out FFT operations for received signals from a plurality of receiving antennas 301, 302, ..., 303. The FFT operation signals are input into a normalizer 330, which generates a normalized value of the received signal. A pilot detection and initial value estimation unit 320 produces an initial sequence estimation value based on a predetermined initial value using a pilot sub-carrier contained in each of OFDM signals from the FFT operation signals. Outputs of the normalizer 330 and pilot detection and initial sequence estimation unit 320 are input into a sequence estimator 340 that estimates an optimum signal sequence and then generates a final sequence estimation value. The final sequence estimation value output from the sequence estimator 340 is input into an STBC decoder 350. The STBC decoder 350 performs an STBC decoding operation to generate a data symbol associated with the final sequence estimation value. The normalizer 330, the sequence estimator 340, and the STBC decoder 350 are separately configured in FIG. 3. However, in an alternate embodiment these components could be implemented as a single unit.

Figure 4:
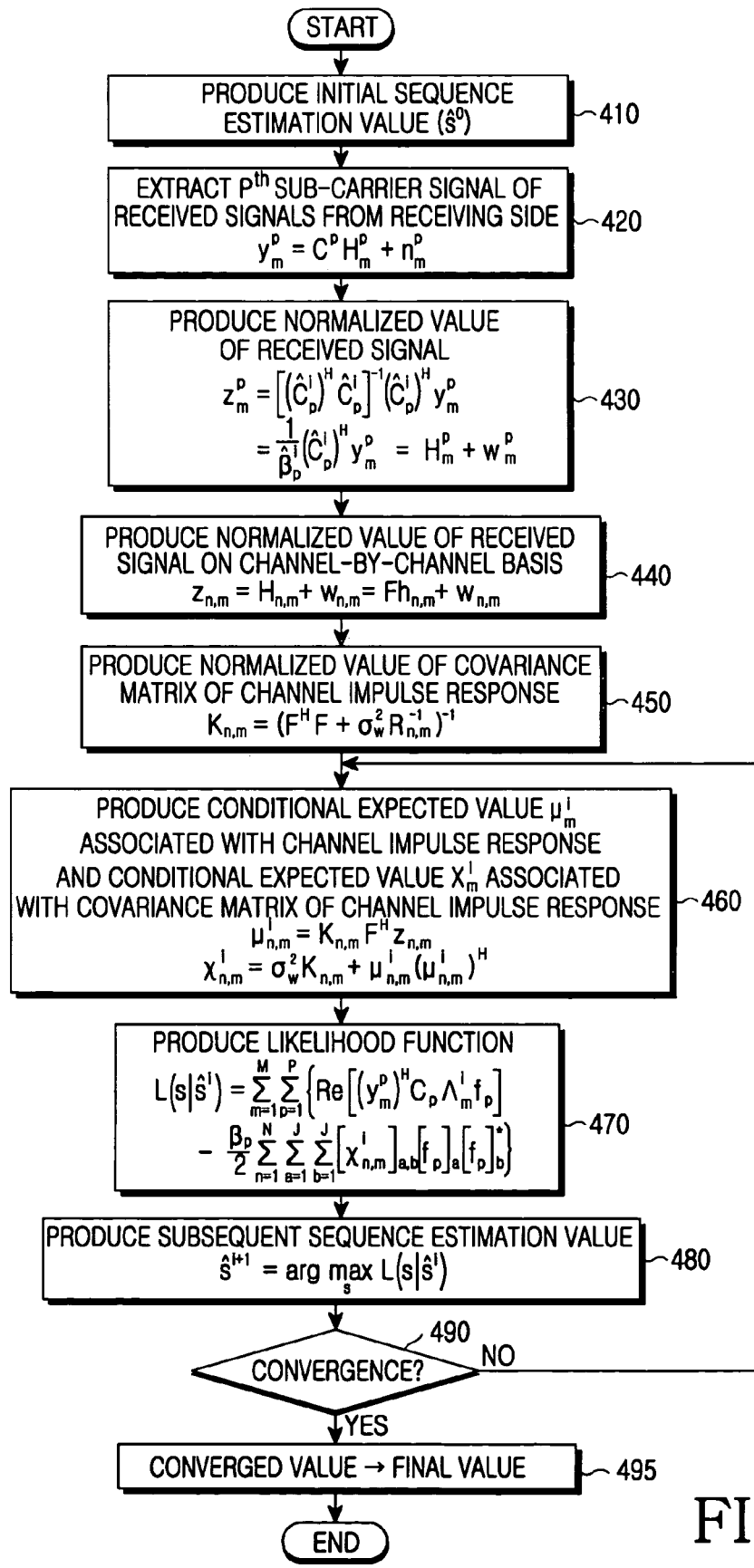
FIG. 4 is a flow chart illustrating a method for estimating a sequence of QAM-modulated signals on a receiving side of a MIMO-OFDM system in accordance with the first embodiment of the present invention.

FIG. 4 is a flow chart illustrating a method for estimating a sequence of QAM-modulated signals on a receiving side of the MIMO-OFDM system in accordance with the first embodiment of the present invention.

Referring to FIG. 4, an initial estimation step is performed at step 410, where the pilot detection and initial value estimation unit 320 produces a repeated initial value, i.e., an initial sequence estimation value $\hat{s}^0$, with a predetermined initial value based on a pilot sub-carrier for each OFDM symbol. The predetermined initial value can be a minimum mean square error (MMSE) estimation value or deterministic maximum likelihood (ML) estimation value.

Steps 420 to 470 correspond to expectation steps.

At step 420, the normalizer 330 extracts a $p^{th}$ sub-carrier signal of received signals from the receiving side as shown in Equation 15.

$$y_m^p = C^p H_m^p + n_m^p \qquad \text{Equation 15}$$

In Equation 15, the subscript "m" denotes an $m^{th}$ receiving antenna, "C" denotes an arbitrary space-time block code matrix, "H" denotes a channel frequency response, and "n" denotes an additive white Gaussian noise (AWGN).

At step 430, the normalizer 330 produces a normalized value $z_m^p = [z_{1,m}^p, z_{2,m}^p, \ldots, z_{N,m}^p]^T$ of a received signal $y_m^p$ using the orthogonality of a space-time code word associated with the received signal extracted in relation to a $p^{th}$ sub-carrier as shown in Equation 16.

$$z_m^p = \left[ (\hat{C}_p^i)^H \hat{C}_p^i \right]^{-1} (\hat{C}_p^i)^H y_m^p \qquad \text{Equation 16}$$
$$= \frac{1}{\hat{\beta}_p^i} (\hat{C}_p^i)^H y_m^p$$
$$= H_m^p + w_m^p$$

In Equation 16, $(\hat{C}_p^i)^H \hat{C}_p^i = \beta_p^i I$, and $w_m^p = [w_{1,m}^p, w_{2,m}^p, \ldots, w_{N,m}^p]^T$. "$w_m^p$" is given by the following Equation 17.

$$w_m^p = \frac{1}{\hat{\beta}_p^i}(\hat{C}_p^j)^H n_m^p \qquad \text{Equation 17}$$

At step 440, the normalizer 330 produces a normalized value $z_{n,m}$ of the received signal on a channel-by-channel basis using Equation 18 by computing normalized values of received signals for the respective sub-carriers on the basis of channels 1, 2, . . . , N.

$$z_{n,m} = H_{n,m} + w_{n,m} = F h_{n,m} + w_{n,m} \qquad \text{Equation 18}$$

In Equation 18, $w_{n,m} = [w_{n,m}^1, w_{n,m}^2, \ldots, w_{n,m}^P]^T$ and $w_{n,m}$ elements are independent from each other. A covariance matrix associated with the AWGN of a channel from an $n^{th}$ transmitting antenna to an mn receiving antenna is expressed as in Equation 19. Further, "F" denotes a discrete Fourier transform matrix, and "$h_{n,m}$" denotes an impulse response associated with the channel from the $n^{th}$ transmitting antenna to the $m^{th}$ receiving antenna.

$$\sigma_w^2 I = \rho \sigma_n^2 I \qquad \text{Equation 19}$$

In Equation 19, "$\sigma_w^2$" denotes a noise variable of the channel from the $n^{th}$ transmitting antenna to the $m^{th}$ receiving antenna, and "$\sigma_n^2$" denotes a noise variable of a signal received by the $m^{th}$ receiving antenna. Further, "I" denotes an identity matrix, and "$\rho$" denotes a variance scaling factor as expressed in Equation 20.

$$\rho = E\left[\frac{\sum_{l=1}^{L}|c_n(l)|^2}{\beta^2}\right] \qquad \text{Equation 20}$$

In Equation 20, "$c_n(l)$" denotes an element of the space-time block code matrix C, and $C^H C = \beta I$. The variance scaling factor $\rho$ is shown in the following Table 1.

TABLE 1

| | Variance Scaling Factor | | |
|---|---|---|---|
| STBC | QPSK | 16-QAM | 64-QAM |
| Rate 1(N = 2) | 0.5 | 0.659 | 0.700 |
| Rate 3/4(N = 3, 4) | 0.333 | 0.389 | 0.398 |
| Rate 1/2(N = 3, 4) | 0.125 | 0.139 | 0.141 |

The normalizer 330 produces a normalized value of the covariance matrix of the channel impulse response as shown in Equation 21 when the covariance matrix for the channel impulse response is given by $R_{n,m} = E[h_{n,m} h_{n,m}^H]$ at step 450.

$$K_{n,m} = (F^H F + \sigma_w^2 R_{n,m}^{-1})^{-1} \qquad \text{Equation 21}$$

In Equation 21, "R" denotes the covariance matrix of the channel impulse response, and "D" denotes a symbol contained in the OFDM signal.

The normalized value of the covariance matrix of the channel impulse response as shown in Equation 21 is not expressed as a function associated with the $i^{th}$ sequence estimation value. Further, "F" denotes a discrete Fourier transform matrix, and "$R_{n,m}$" denotes the covariance matrix of the channel impulse response. As long as channel covariance is not changed, the covariance matrix can be used for not only an $i^{th}$ sequence, but also a $(i+1)^{th}$ sequence. Thus, the normalized value $K_{n,m}$ of the covariance matrix of the channel impulse response associated with the $i^{th}$ sequence estimation value is produced, and the produced normalized value $K_{n,m}$ can again be used to produce the subsequent $(i+1)^{th}$ sequence estimation value. Subsequent sequence estimation values can be produced without producing a separate inverse matrix at each iteration time.

As shown in Equations 22 and 23 below, the sequence estimator 340 produces the conditional expected value $\mu_m^i$ associated with the channel impulse response shown in Equation 11 above, and the conditional expected value $x_m^i$ associated with the covariance matrix of the channel impulse response shown Equation 13 above, at step 460.

$$\mu_{n,m}^i = K_{n,m} F^H z_{n,m} \qquad \text{Equation 22}$$

$$x_{n,m}^i = \sigma_w^2 K_{n,m} + \mu_{n,m}^i (\mu_{n,m}^i)^H \qquad \text{Equation 23}$$

At step 470, the sequence estimator 340 produces a likelihood function assumed under a specific probability distribution according to Equation 24.

$$L(s|\hat{s}^i) = \sum_{m=1}^{M}\sum_{p=1}^{P}\left\{\text{Re}\left[(y_m^p)^H C_p \Lambda_m^i f_p\right] - \frac{\beta_p}{2}\sum_{n=1}^{N}\sum_{a=1}^{J}\sum_{b=1}^{J}[x_{n,m}^i]_{a,b}[f_p]_a[f_p]_b^*\right\} \qquad \text{Equation 24}$$

In Equation 24, "$\Lambda_m^i$" denotes a matrix of a conditional expected value associated with the channel impulse response, and is given by $\Lambda_m^i = [\mu_{1,m}^i, \mu_{2,m}^i, \ldots, \mu_{n,m}^i]^T$. "$\mu_{n,m}^i$" denotes the conditional expected value associated with the channel impulse response, and is given by $\mu_{n,m}^i = E[h_{n,m}|y_m, \hat{s}^i]$. "$[x_{n,m}^i]_{a,b}$" denotes a conditional expected value associated with the covariance matrix of the channel impulse response, and is given by $[x_{n,m}^i]_{a,b} = E[h_{n,m}^a (h_{n,m}^b)^H|y_m, \hat{s}^i]$. "C" and "f" denote a space-time block code matrix and an element of a discrete Fourier transform matrix, respectively. "M", "P", "N", and "J" denote the number of receiving antennas, the number of sub-carriers, the number of transmitting antennas, and the number of paths associated with the channel impulse response, respectively. Further, $C^H C = \beta I$.

Steps 480 to 495, described herein below, correspond to maximization steps.

At step 480, the sequence estimator 340 produces the $(i+1)^{th}$ sequence estimation value, i.e., the subsequent sequence estimation value, shown in Equation 25 using the likelihood function of Equation 24.

$$\hat{s}^{i+1} = \arg\max_s L(s|\hat{s}^i) \qquad \text{Equation 25}$$

At step 490, the sequence estimator 340 determines whether the subsequent sequence estimation value converges to a constant value. If the subsequent sequence estimation value converges to the constant value, step 495 is performed. Otherwise, steps 460 to 490 are repeated.

At step 495, the sequence estimator 340 determines that the sequence estimation value converged to the constant value to be a final sequence estimation value of a desired detection signal. A data symbol associated with the final sequence estimation value is then detected by the STBC decoder 350.

Figure 5:
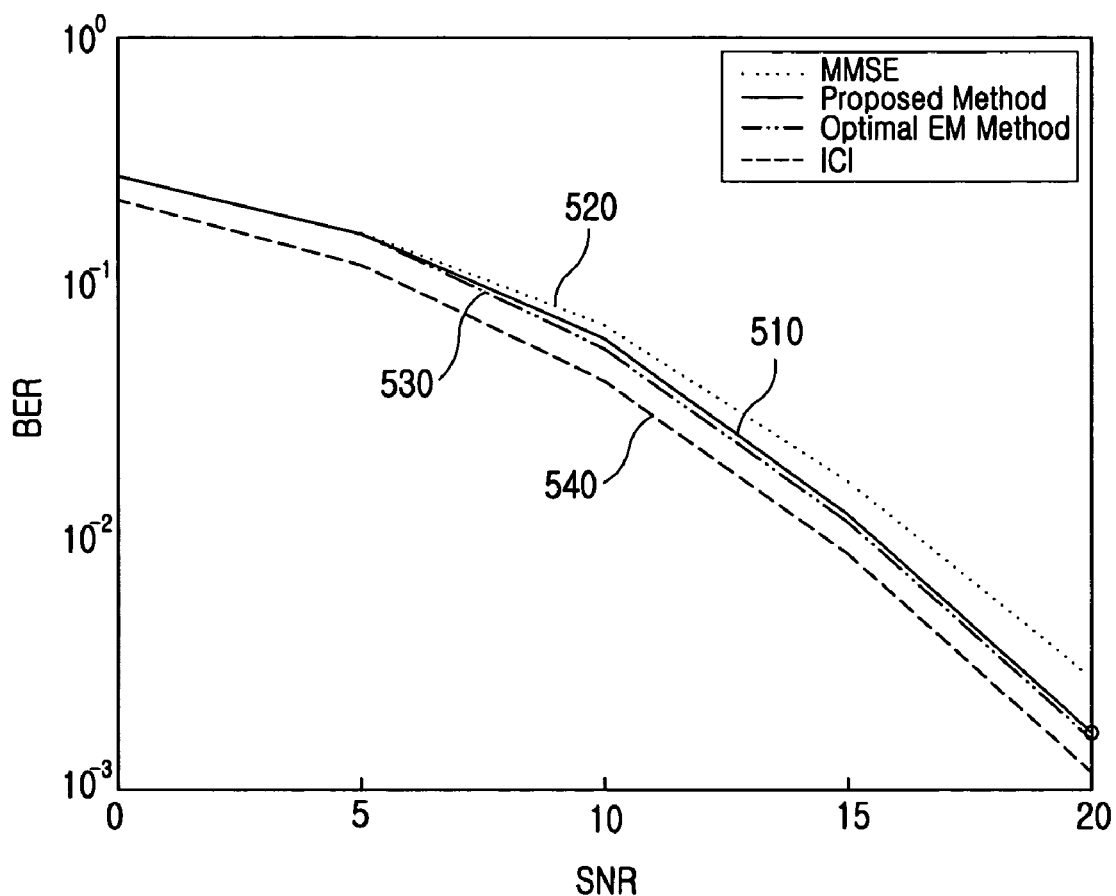
FIG. 5 is a graph illustrating a bit error rate (BER) performance when a space-time block code based on a rate 1 for two transmitting antennas and one receiving antenna is used (where $f_dT_s=0.005$ for 16-QAM) in accordance with the first embodiment of the present invention.

FIG. 5 is a graph illustrating the bit error rate (BER) performance when a space-time block code based on a rate 1 for two transmitting antennas and one receiving antenna is used (where $f_dT_s$=0.005 for 16-QAM) in accordance with the first embodiment of the present invention.

Figure 6:
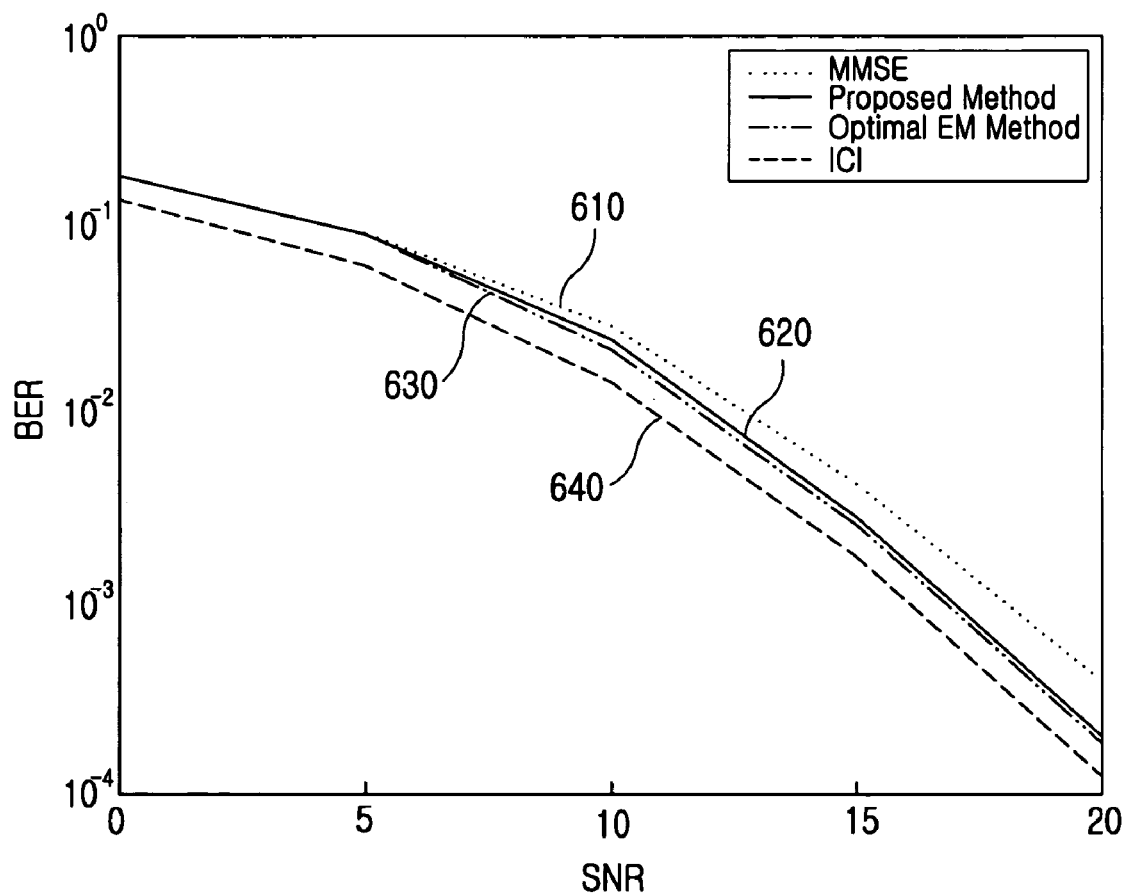
FIG. 6 is a graph illustrating the BER performance when a space-time block code based on a rate ¾ for three transmitting antennas and one receiving antenna is used (where $f_dT_s=0.005$ for 16-QAM) in accordance with the first embodiment of the present invention.

FIG. 6 is a graph illustrating a BER performance when a space-time block code based on a rate ¾ for three transmitting antennas and one receiving antenna is used (where $f_dT_s$=0.005 for 16-QAM) in accordance with the first embodiment of the present invention.

Figure 7:
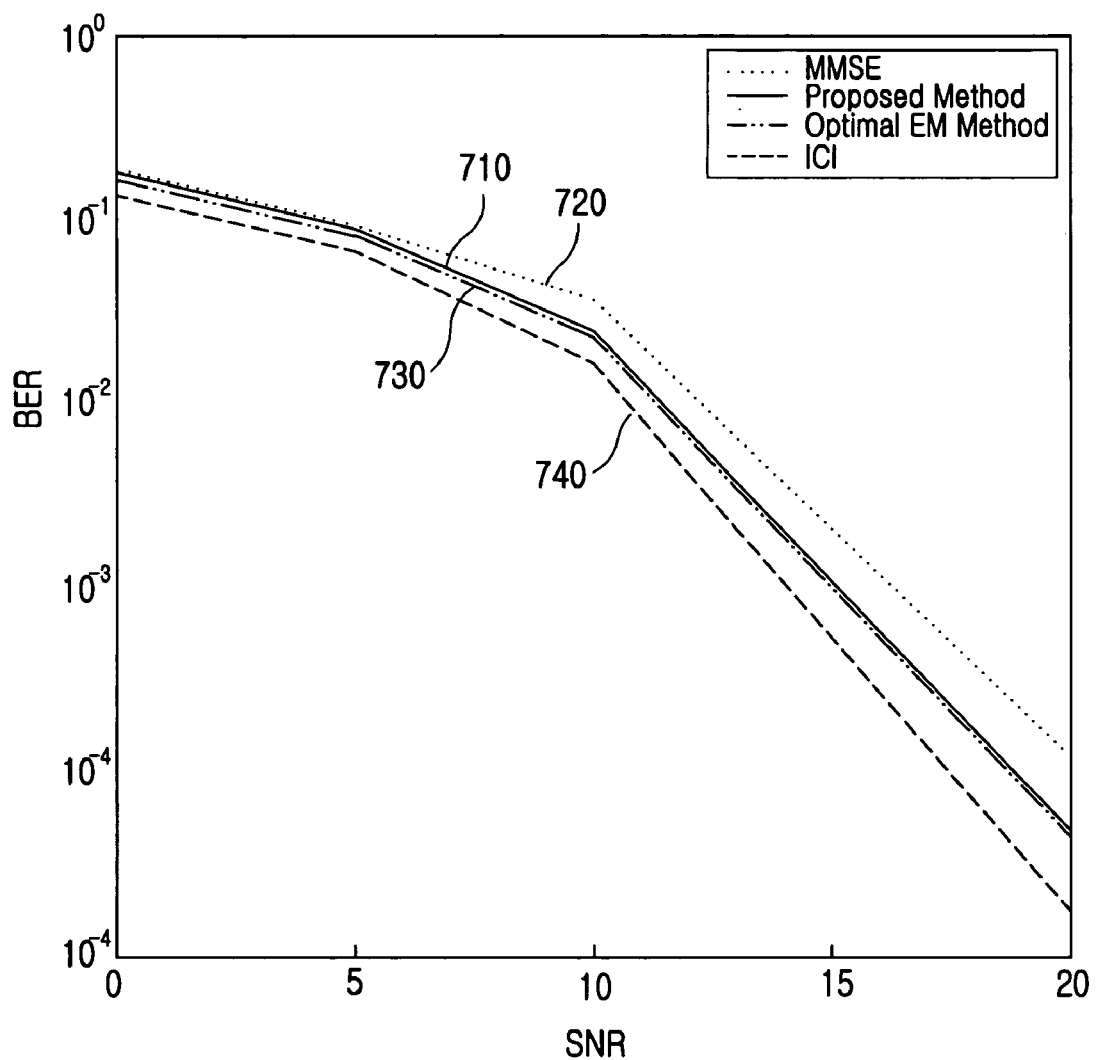
FIG. 7 is a graph illustrating the BER performance when a space-time block code based on a rate ¾ for four transmitting antennas and one receiving antenna is used (where $f_dT_s=0.005$ for 16-QAM) in accordance with the first embodiment of the present invention.

FIG. 7 is a graph illustrating the BER performance when a space-time block code based on a rate ¾ for four transmitting antennas and one receiving antenna is used (where $f_dT_s$=0.005 for 16-QAM) in accordance with the first embodiment of the present invention.

Computer simulation environments associated with FIGS. 5, 6, and 7 have been configured utilizing a physical layer standard of IEEE 802.11a. In this case, the power delay profile of a frequency selective-fading channel is shown by $$E[|h_{n,m}^a|^2] = \exp\left(-\frac{(a-1)}{10}\right),$$

$\alpha$=1, 2, ..., J. It is assumed that each multiple path endures independent Rayleigh fading.

In accordance with the embodiment of the present invention, the initialization process and a one-time iteration process are carried out. As illustrated in FIGS. 5, 6, and 7, the BER performances indicated by reference numerals 510, 610, and 710, which are associated with the EM-based iterative estimation method being the proposed method, are better than BER performances associated with a combination-type method indicated by reference numerals 520, 620, and 720. Further, the BER performances indicated by reference numerals 510, 610, and 710, which are associated with the EM-based iterative estimation method, are substantially equal to BER performances indicated by reference numerals 530, 630, and 730, which are associated with an optimal EM method, which does not limit the number of iterations. In other words, if the iteration process is performed in accordance with the embodiment of the present invention, the BER performance converges after one or more iterations. Further, solid lines indicated by reference numerals 540, 640, and 740 denote BER performances of ideal channel information (ICI) when it is assumed that the receiving side recognizes characteristics of all channels.

Figure 8:
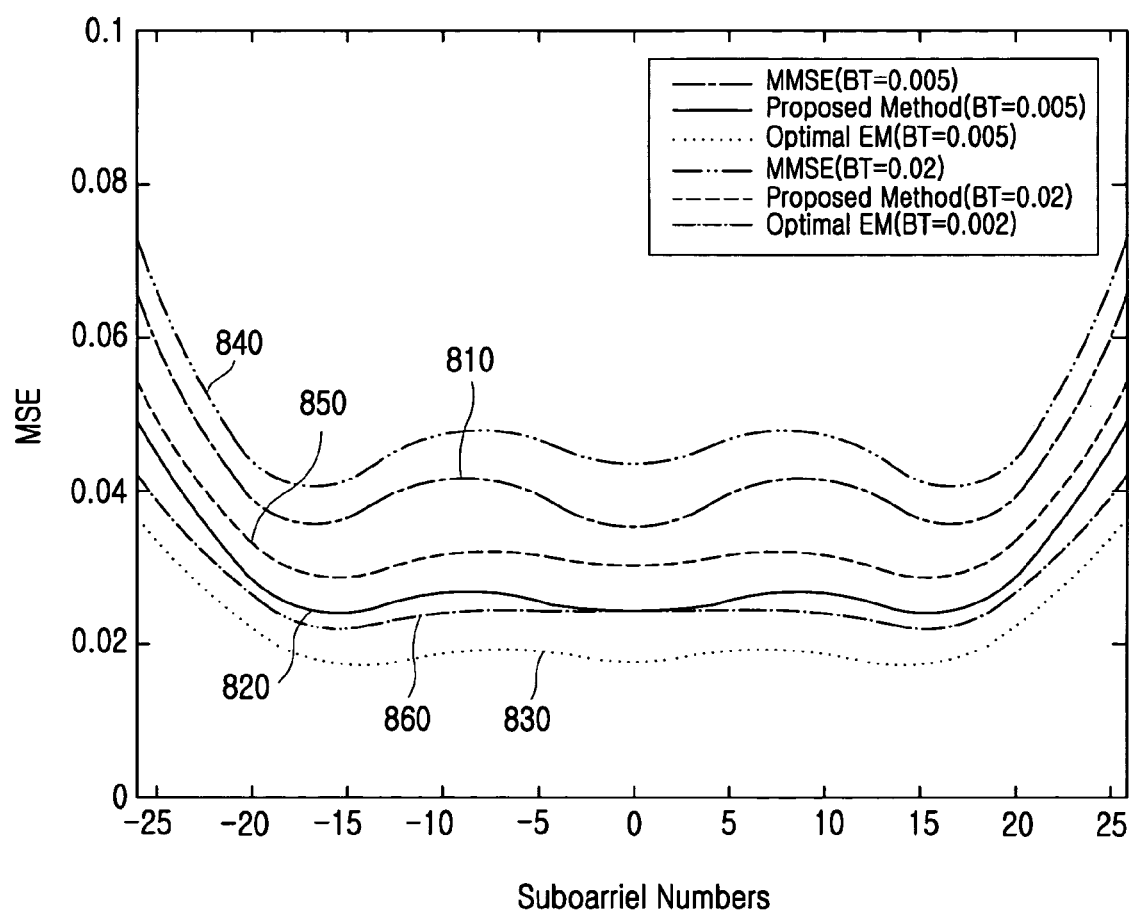
FIG. 8 is a graph illustrating the mean squared error (MSE) performance when a space-time block code based on a rate 1 for two transmitting antennas and one receiving antenna is used (where $f_dT_s=0.005$ for 16-QAM) in accordance with the first embodiment of the present invention.

FIG. 8 is a graph illustrating a mean squared error (MSE) performance when a space-time block code based on a rate 1 for two transmitting antennas and one receiving antenna is used in accordance with the first embodiment of the present invention. More specifically, FIG. 8 illustrates mean square errors (MSEs) associated with reference numerals 810 and 840 based on the combination-type method, reference numerals 820 and 850 based on the first embodiment of the present invention, and reference numerals 830 and 860 based on the optimal EM method, which does not limit the number of iterations, when a signal-to-noise ratio (SNR) is 10 dB. A horizontal axis indicates a sub-carrier number and a vertical axis indicates an MSE magnitude. Further, FIG. 8 illustrates when two transmitting antennas, i.e., a 16-QAM and an STBC based on a rate 1, are used. Curves indicated by the reference numerals 810, 820, and 830 correspond to when BT=0.005, and curves indicated by the reference numerals 840, 850, and 860 correspond to when BT=0.02. Although a one-time iteration is performed in accordance with the first embodiment of the present invention as illustrated in FIG. 8, the present invention can reduce approximately half of the MSE associated with the conventional MMSE method.

Figure 9:
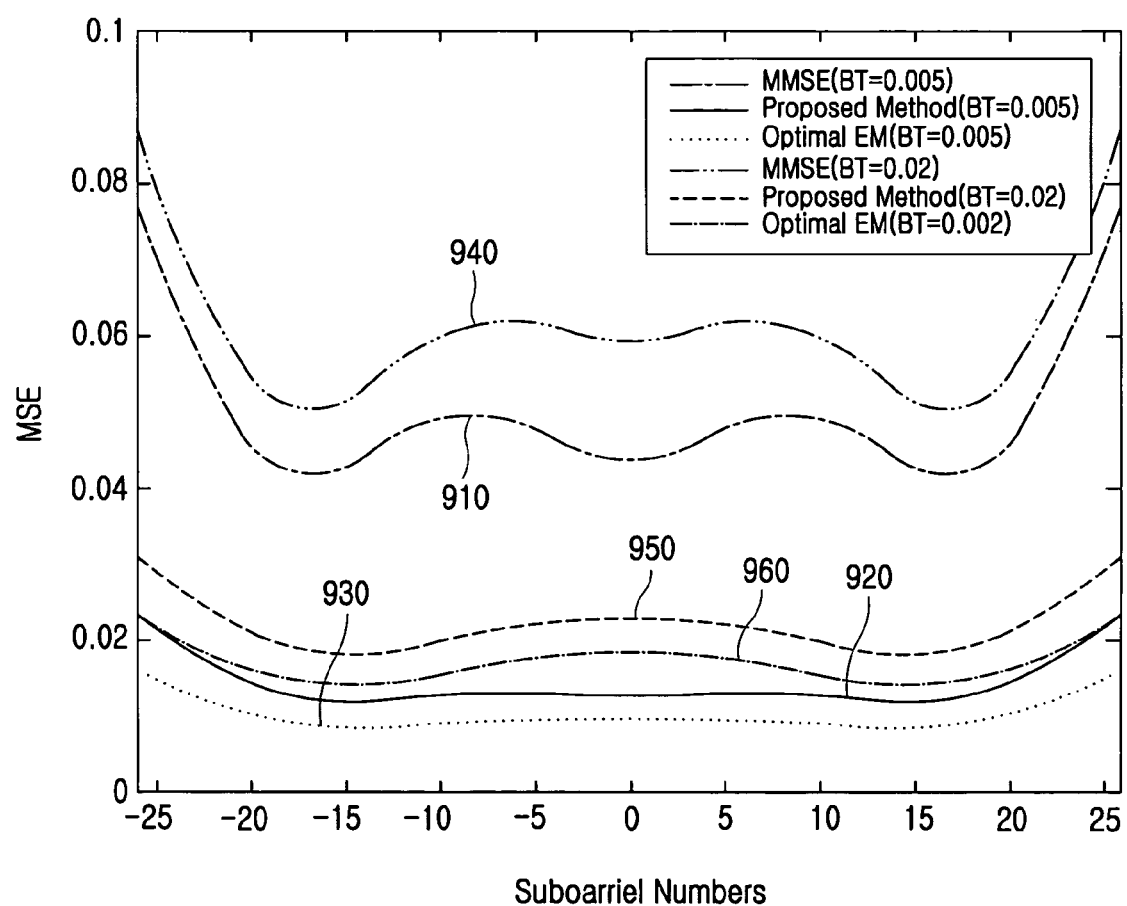
FIG. 9 is a graph illustrating the MSE performance when a space-time block code based on a rate ¾ for four transmitting antennas and one receiving antenna is used (where $f_dT_s=0.005$ for 16-QAM) in accordance with the first embodiment of the present invention.

FIG. 9 is a graph illustrating an MSE performance when a space-time block code based on a rate ¾ for four transmitting antennas and one receiving antenna is used in accordance with the first embodiment of the present invention. More specifically, FIG. 9 illustrates average mean square errors (MSEs) associated with reference numerals 910 and 940 based on a combination-type method, reference numerals 920 and 950 based on the first embodiment of the present invention, reference numerals 930 and 960 based on an optimal EM method, which does not limit the number of iterations, when a signal-to-noise ratio (SNR) is 10 dB. A horizontal axis indicates an SNR value and a vertical axis indicates an average MSE value of each sub-carrier. Further, FIG. 9 illustrates when two transmitting antennas, i.e., a 16-QAM and an STBC based on a rate ¾, are used. Curves indicated by the reference numerals 910, 920, and 930 correspond to when BT=0.005, and curves indicated by the reference numerals 940, 950, and 960 correspond to when BT=0.01. Although a one-time iteration is performed in accordance with the first embodiment of the present invention as illustrated in FIG. 9, the present invention can reduce approximately half or more of the average MSE associated with the conventional MMSE method when SNR is 10 dB or more.

As illustrated in FIGS. 8 and 9, the first embodiment of the present invention can obtain an SNR gain of approximately 2~3 dB in comparison with the conventional method. Thus, although transmission electric power is reduced by 30~50%, a desired BER can still be obtained. Further, where original transmission electric power is used, a radius of a cell can be extended. In accordance with the first embodiment of the present invention, the system can be easily implemented because inverse matrices, which consist of rows and columns corresponding to the number of sub-carriers, do not need to be produced every time the iteration process is performed.

Second Embodiment

The second embodiment of the present invention uses a signal sequence according to an optimal expectation-maximization (EM)-based iterative estimation algorithm for a signal received through one of a plurality of receiving antennas 301, 302, ..., 303 in a multiple-input and multiple-output (MIMO) orthogonal frequency division multiplexing (OFDM) reception system in accordance with the embodiment of the present invention illustrated in FIG. 3. The second embodiment of the present invention proposes a method capable of estimating the signal sequence without producing an inverse matrix of a sequence estimation value by employing a normalized value of the received signal at each iteration time when the signal sequence is estimated using the EM-based iterative estimation algorithm.

Before the second embodiment of the present invention is described in detail, the method for estimating the signal sequence according to the EM-based iterative estimation algorithm for transmitted QAM-modulated and space-time block coded signals using one receiving antenna of the MIMO-OFDM mobile communication system will be described.

When the number of sub-carriers carrying data symbols transmitted from a transmitting side of the OFDM system is denoted by "N", and the number of data symbols to be transmitted is denoted by "P=2N_α+1", a transmission data symbol vector is expressed as in Equation 26.

$$s=[s(-N_\alpha), \ldots s(-1), s(0), s(1), \ldots s(N_\alpha)]^T \quad \text{Equation 26}$$

In this case, (N-P) sub-carriers located at both edges of spectrum are not used such that aliasing associated with the sub-carriers can be prevented.

Where data is transmitted from the OFDM system, a signal y received through a frequency selective-fading channel is expressed as in Equation 27.

$$Y=SFh+n \quad \text{Equation 27}$$

In Equation 27, "S" denotes a diagonal matrix defined by data symbols, and is expressed as "S=diag[s(-N_α), ... s(-1), s(0), s(1), ... s(N_α)]". "h" denotes a channel impulse response, and is expressed as "h=[h(1), h(2), ... h(L)]^T". The notation $[\cdot]^T$ denotes a vector transpose operation. "n" denotes an AWGN vector and its average value is zero. A covariance matrix is denoted by "$\sigma_n^2 I$". "$\sigma_n^2$" denotes a noise variable, and "I" denotes an identity matrix. Further, "F" denotes a discrete Fourier transform matrix, and is expressed as in Equation 28.

$$[F]_{n,k} = e^{-j\frac{2\pi n(k-1)}{N}} \quad \text{Equation 28}$$

In Equation 28, the subscript n denotes a frequency index, and $|n| \leq N_\alpha$. The subscript "k" denotes a time index, and "$1 \leq k \leq L$" where L is the number of channels.

Further, a channel frequency response H=[H(-N_α), ... H(-1), H(0), H(1), ... H(N_α)], and is expressed as in Equation 29.

$$H=Fh \quad \text{Equation 29}$$

The signal sequence received by the receiving side of the MIMO-OFDM mobile communication system is estimated by the EM-based iterative estimation algorithm as follows.

First, a repeated initial value, i.e., an initial sequence estimation value $s^0$, is produced according to a predetermined initial value using a pilot sub-carrier for each OFDM symbol at an initial estimation step. The predetermined initial value can be a minimum mean square error (MMSE) estimation value or deterministic maximum likelihood (ML) estimation value.

Next, a likelihood function as shown in Equation 30 is produced at an expectation step.

$$Q(s \mid s^i) = \sum_{k=-N_a}^{N_a} \left\{ \text{Re}\left[ y^*(k)s(k) \sum_{l=1}^{L} [F]_{k,l} m_1^i(l) \right] - \frac{1}{2}|s_k|^2 \sum_{l=1}^{L} \sum_{m=1}^{L} [F]_{k,m}^* m_2^i(l, m) \right\} \quad \text{Equation 30}$$

In the above Equation 30, "L" denotes the number of channels. "$m_1^i$" denotes a conditional expected value associated with the channel impulse response h where a received signal y and an $i^{th}$ sequence estimation value $s^i$ are given. The above-described "$m_1^i$" is expressed as in Equation 31.

$$m_1^i = [m_1^i(1), m_1^i(2), \ldots, m_1^i(L)]^T = E[h|y, s^i] = R'F^H(s^i)^*y \quad \text{Equation 31}$$

In Equation 31, the notation $(\cdot)^H$ (a conjugated transpose) denotes a Hermitian transpose operation, the notation $E[\cdot]$ denotes an operation for computing an average value (or expected value), and the notation $(\cdot)^*$ denotes a complex-conjugate operation. A normalized value $R^i$ of the channel impulse response is given by Equation 32 when a covariance matrix of the channel impulse response is $R_h=E[h\, h^H]$.

$$R^i = [\sigma_n^2 R_h^{-1} + F^H(s^i)^* s^i F]^{-1} \quad \text{Equation 32}$$

Further, "$m_2^i$" denotes a conditional expected value associated with a covariance matrix of the channel impulse response where a received signal y and an $i^{th}$ sequence estimation value $s^i$ are given. The above-described "$m_2^i$" is expressed as in Equation 33.

$$m_2^i = \begin{bmatrix} m_2^i(1,1) & m_2^i(1,2) & \cdots & m_2^i(1,L) \\ m_2^i(2,1) & m_2^i(2,2) & \cdots & m_2^i(2,L) \\ & & \cdots & \\ m_2^i(L,1) & m_2^i(L,2) & \cdots & m_2^i(L,L) \end{bmatrix}$$

$$= E[hh^H \mid y, s^i]$$

$$= \sigma_n^2 R' + m_1^i (m_1^i)^H \quad \text{Equation 33}$$

At a maximization step, a $(i+1)^{th}$ sequence estimation value, i.e., a subsequent sequence estimation value, is produced by Equation 34.

$$s^{i+1} = \arg\max_s Q(s \mid s^i) \quad \text{Equation 34}$$

A procedure of producing the subsequent sequence estimation value is repeated until the sequence estimation value converges to a constant value. If the sequence estimation value converges through the above-described procedure, the converged value is determined to be a final sequence estimation value, and then a data symbol associated with the final sequence estimation value is detected by STBC decoding.

When the signal sequence is estimated by the receiving side of the MIMO-OFDM mobile communication system using the conventional EM-based iterative estimation method, $(s^i)^* s^i$ is previously produced and the previously produced $(s^i)^* s^i$ value is used for producing the conditional expected value $m_1^i$ of the channel impulse response, because $(s^i)^* s^i$ contained in an inverse matrix of Equation 32 associated with the normalized value $R^i$ of the channel impulse response has a constant value despite an i order where phase shift keying (PSK) modulation having constant envelope characteristics is used.

However, when the QAM having the high frequency efficiency is used, the above-described inverse matrix must be produced every time the subsequent sequence estimation value is produced because $(s^i)^* s^i$ contained in an inverse matrix of the normalized value $R^i$ of the channel impulse response in Equation 32 is a function of the $i^{th}$ sequence estimation value. When the procedure of obtaining the inverse matrix is implemented on the system, the system becomes unstable. In other words, it is impossible to implement the procedure of obtaining the inverse matrix on the system.

Thus, the present invention provides a new method capable of estimating the signal sequence using the EM-based iterative estimation algorithm without producing the inverse matrix associated with the $i^{th}$ sequence estimation value when the QAM is used.

Figure 10:
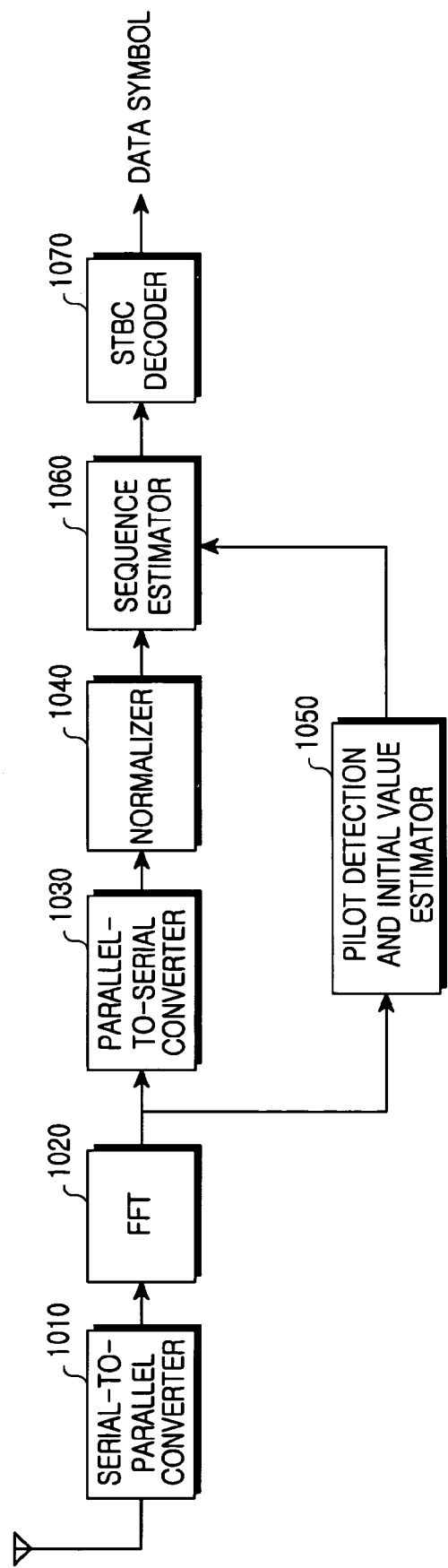
FIG. 10 is a block diagram illustrating a MIMO-OFDM reception system in accordance with a second embodiment of the present invention.

FIG. 10 is a schematic diagram illustrating a MIMO-OFDM reception system in accordance with the second embodiment of the present invention. Referring to FIG. 10, a signal received by the receiving side is converted into a parallel signal by a serial-to-parallel converter 1010, and Fourier fast transform (FFT) processor 1020 performs an FFT operation for the parallel signal. A parallel-to-serial converter 1030 converts an FFT operation signal from the FFT processor 1020 into a serial signal. Then, the serial signal from the parallel-to-serial converter 1030 is input into a normalizer 1040. The normalizer 1040 generates a normalized value of the received signal. Then, a pilot detection and initial value estimation unit 1050 produces an initial sequence estimation value based on a predetermined initial value using a pilot sub-carrier contained in each of OFDM signals from the FFT operation signal. Then, outputs of the normalizer 1040 and pilot detection and initial sequence estimation unit 1050 are input into a sequence estimator 1060. The sequence estimator 1060 estimates an optimum signal sequence and generates a final sequence estimation value. The final sequence estimation value output from the sequence estimator 1060 is input into an STBC decoder 1070. The STBC decoder 1070 performs an STBC decoding operation to generate a data symbol associated with the final sequence estimation value. The normalizer 1040, the sequence estimator 1060, and the STBC decoder 1070 are separately configured in FIG. 10, however, in an alternate embodiment, the normalizer 1040, the sequence estimator 1060, and the STBC decoder 1070 can be implemented as a single unit.

Figure 11:
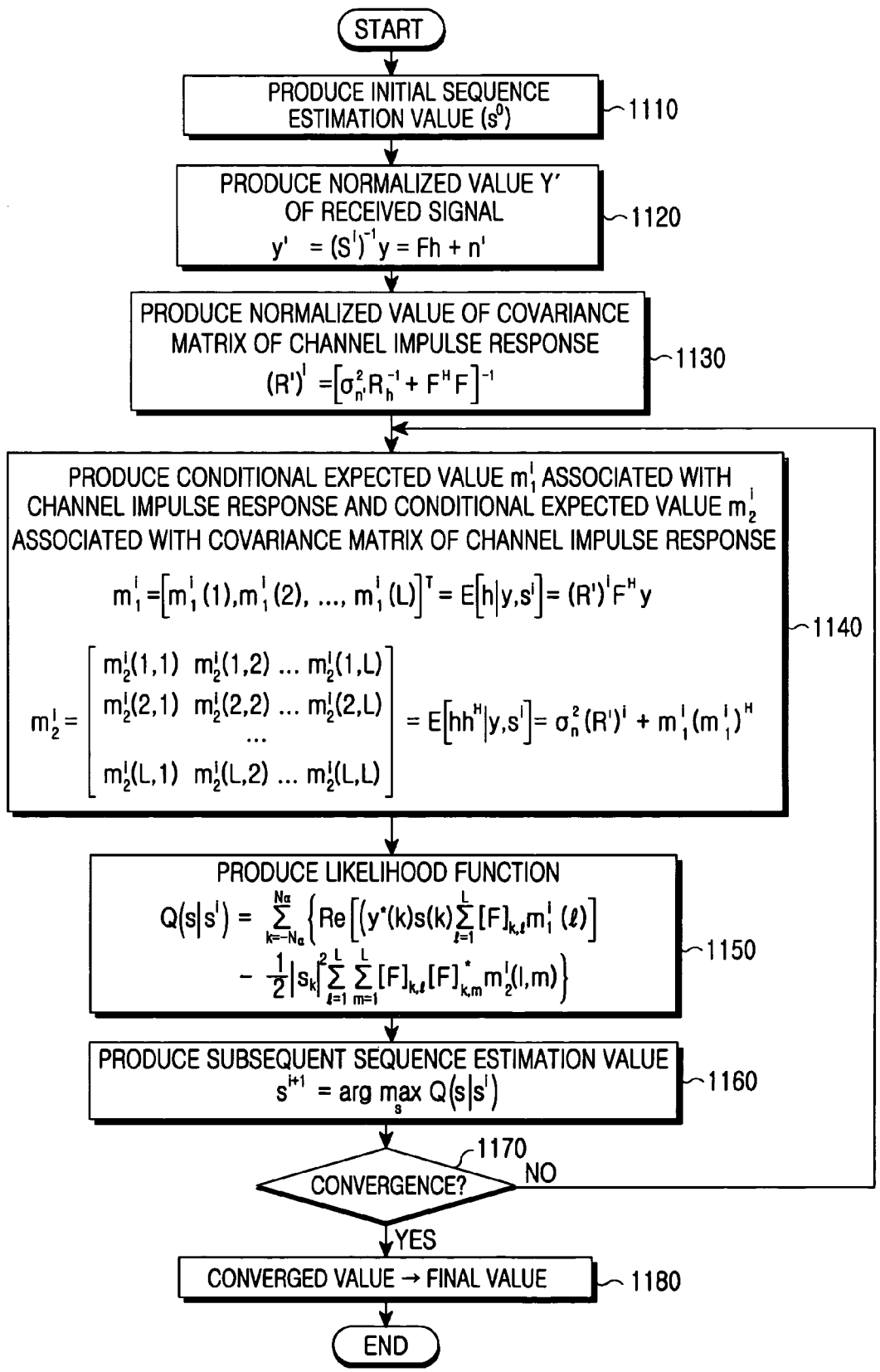
FIG. 11 is a flow chart illustrating a method for estimating a sequence of QAM-modulated signals through one receiving antenna of a MIMO-OFDM system in accordance with the second embodiment of the present invention.

FIG. 11 is a flow chart illustrating a method for estimating a sequence of QAM-modulated signals using one receiving antenna of the MIMO-OFDM system in accordance with the second embodiment of the present invention. In FIG. 11, step 1110 corresponds to an initial estimation step, steps 1110 to 1150 correspond to expectation steps, and steps 1160 and 1180 correspond to maximization steps.

At step 1110, the pilot detection and initial value estimation unit 1050 produces a repeated initial value, i.e., an initial sequence estimation value $s^0$, with a predetermined initial value based on a pilot sub-carrier for each OFDM symbol. The predetermined initial value can be a minimum mean square error (MMSE) estimation value or deterministic maximum likelihood (ML) estimation value. At step 1120, the normalizer 1040 produces a normalized value y' of the received signal using an $i^{th}$ sequence estimation value $s^i$ as in Equation 35.

$$y' = (s^i)^{-1} y = Fh = n'$$ Equation 35

In Equation 35, $n' = (s^i)^{-1} n$. It is assumed that "n'" is a channel white Gaussian noise as in Equation 36.

$$\sigma_{n'}^2 = \frac{1}{M} \sum_{m=1}^{M} \frac{\sigma_n^2}{|s_m|^2} = \beta \sigma_n^2$$ Equation 36

In Equation 36, "$s_m$" denotes an $m^{th}$ symbol based on M-ary QAM, and "$\sigma_n^2$" denotes a noise variable. Further, "β" denotes a variance scaling factor. β=1 for PSK, β=1.998 for 16-QAM, and β=2.6854 for 64-QAM.

At step 1130, the normalizer 1040 obtains a normalized value of a covariance matrix of the channel impulse response as in Equation 37 when a covariance matrix of the channel impulse response is given by $R_h = E[h\ h^H]$.

$$(R')^i = [\sigma_{n'}^2 R_h^{-1} + F^H F]^{-1}$$ Equation 37

In Equation 37, the normalized value of the covariance matrix of the channel impulse response is not expressed as a function of the $i^{th}$ sequence estimation value. Further, "F" denotes a discrete Fourier transform matrix, and "$R_h$" denotes the covariance matrix for the channel impulse response. As long as channel covariance is not changed, the covariance matrix can be used for an $i^{th}$ sequence, and also a $(i+1)^{th}$ sequence. Thus, the normalized value $(R')^i$ of the covariance matrix of the channel impulse response associated with the $i^{th}$ sequence estimation value is produced, and the produced normalized value $(R')^i$ can be again used for producing the subsequent $(i+1)^{th}$ sequence estimation value. Subsequent sequence estimation values can be produced without producing a separate inverse matrix at each iteration time.

As shown in Equations 38 and 39 below, the sequence estimator 1060 produces the conditional expected value $m_1^i$ associated with the channel impulse response as shown Equation 31, and the conditional expected value $m_2^i$ associated with a covariance matrix of the channel impulse response as shown in Equation 33 above, at step 1140.

$$m_1^i = [m_1^i(1), m_1^i(2), \ldots, m_1^i(L)]^T = E[h|y, s^i] = (R')^i F^H y$$ Equation 38

$$m_2^i = \begin{bmatrix} m_2^i(1,1) & m_2^i(1,2) & \cdots & m_2^i(1,L) \\ m_2^i(2,1) & m_2^i(2,2) & \cdots & m_2^i(2,L) \\ & & \cdots & \\ m_2^i(L,1) & m_2^i(L,2) & \cdots & m_2^i(L,L) \end{bmatrix}$$ Equation 39

$$= E[hh^H | y, s^i]$$

$$= \sigma_n^2 (R')^i + m_1^i (m_1^i)^H$$

At step 1150, the sequence estimator 1060 obtains a likelihood function assumed under a specific probability distribution according to Equation 40.

$$Q(s|s^i) = \sum_{k=-N_a}^{N_a} \left\{ \mathrm{Re}\left[ y^*(k) s(k) \sum_{l=1}^{L} [F]_{k,l} m_1^i(l) \right] - \frac{1}{2} |s_k|^2 \sum_{l=1}^{L} \sum_{m=1}^{L} [F]_{k,l} [F]_{k,m}^* m_2^i(l, m) \right\}$$ Equation 40

At step 1160, the sequence estimator 1060 produces the $(i+1)^{th}$ sequence estimation value, i.e., the subsequent sequence estimation value, shown in the following Equation 41 using the likelihood function of Equation 40.

$$s^{i+1} = \arg\max_s Q(s|s^i)$$ Equation 41

At step 1170, the sequence estimator 1060 determines whether the subsequent sequence estimation value converge to a constant value. If the subsequent sequence estimation value converges to the constant value, step 1180 is performed. Otherwise, the above steps 1140 to 1170 are repeated.

At step 1180, the sequence estimator 1060 determines that the sequence estimation value, converged to the constant value, to be a final sequence estimation value of a desired detection signal. A data symbol associated with the final sequence estimation value is then detected by the STBC decoder 1070.

Figure 12:
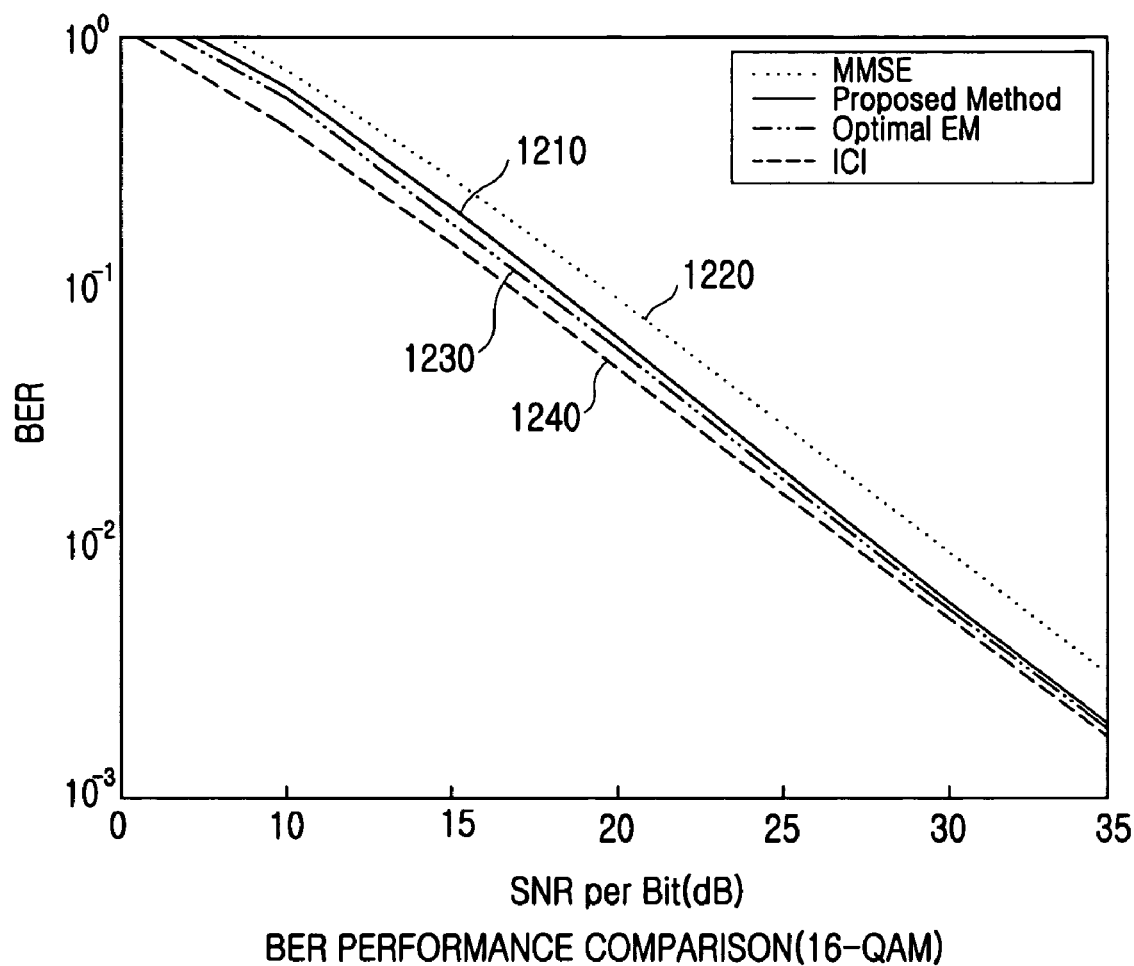
FIG. 12 is a graph illustrating the BER performance based on a method for detecting a received signal in the case of 16-QAM in accordance with the second embodiment of the present invention.
Figure 13:
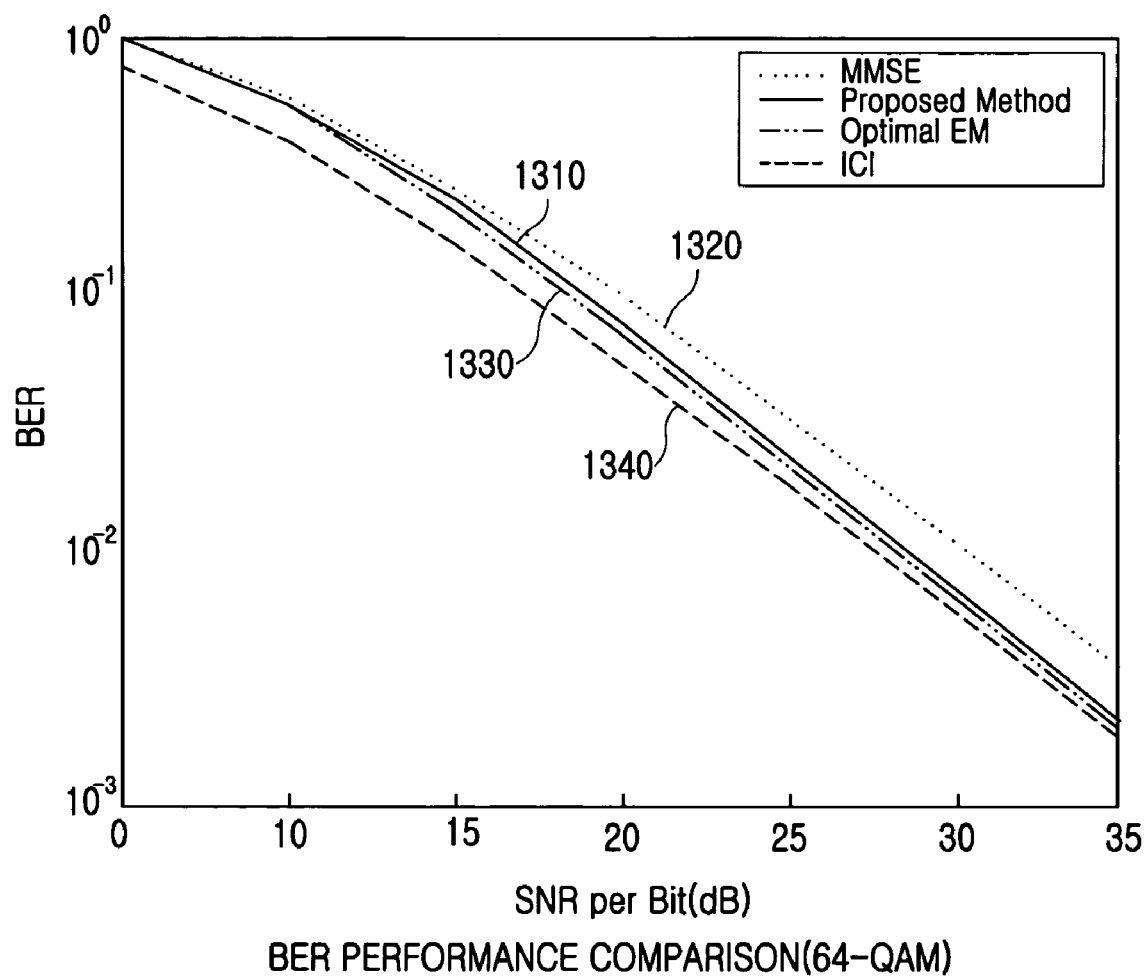
FIG. 13 is a graph illustrating the BER performance based on a method for detecting a received signal in the case of 64-QAM in accordance with the second embodiment of the present invention.

FIG. 12 is a graph illustrating the BER performance according to a method for detecting a received signal in the case of 16-QAM in accordance with the second embodiment of the present invention, and FIG. 13 is a graph illustrating the BER performance according to a method for detecting a received signal in the case of 64-QAM in accordance with the second embodiment of the present invention. Computer simulation environments associated with FIGS. 12 and 13 have been configured utilizing a physical layer standard of IEEE 802.11a. In this case, the power delay profile of a frequency selective-fading channel is $$E[|h(i)|^2] = \exp\left(-\frac{(i-1)}{10}\right), i = 1, 2, \cdots, L.$$

i=1,2 , . . . , L. It is assumed that each of multiple paths endures independent Rayleigh fading.

In accordance with the second embodiment of the present invention, the initialization process and a one-time iteration process are performed. As illustrated in FIGS. 12 and 13, BER performances indicated by reference numerals 1210 and 1310, which are associated with the EM-based iterative estimation method being the proposed method, are better than BER performances associated with a combination-type method indicated by reference numerals 1220 and 1320. Further, the BER performances indicated by the reference numerals 1210 and 1310, which are associated with the EM-based iterative estimation method, are substantially equal to the BER performances indicated by the reference numerals 1220 and 1320 that are associated with an optimal EM method, which does not limit the number of iterations. In other words, if the iteration process is performed in accordance with the second embodiment of the present invention, the BER performance converges after one or more iterations. Additionally, solid lines indicated by reference numerals 1240 and 1340 denote BER performances of ideal channel information (ICI) when it is assumed that the receiving side correctly recognizes characteristics of all channels.

Figure 14:
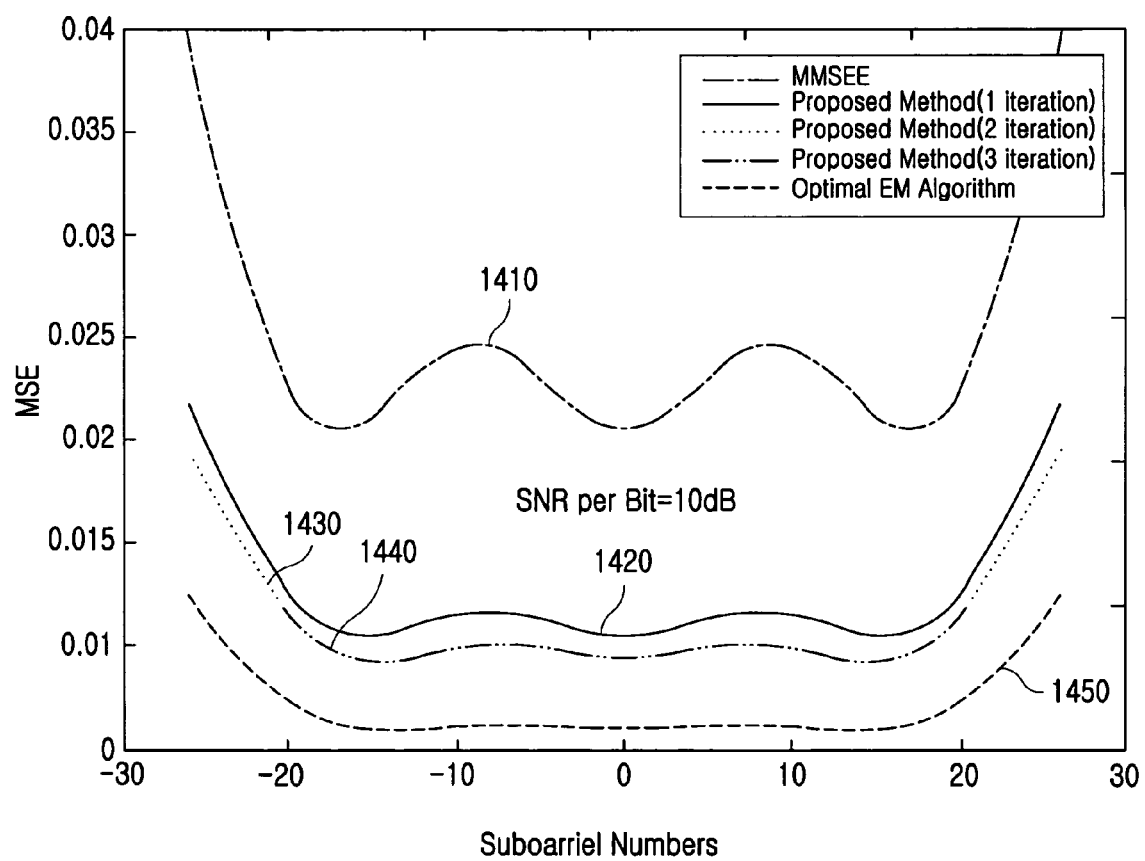
FIG. 14 is a graph illustrating an improved MSE performance based on an iterative procedure in accordance with the second embodiment of the present invention.

FIG. 14 is a graph illustrating the improved MSE performance based on an iterative procedure in accordance with the second embodiment of the present invention. More particularly, FIG. 14 illustrates mean square errors (MSEs) associated with a reference numeral 1410 based on a combination-type method, reference numerals 1420, 1430, and 1440 based on the second embodiment of the present invention, and a reference numeral 1450 based on the optimal EM method, which does not limit the number of iterations, when a signal-to-noise ratio (SNR) is 10 dB. A horizontal axis indicates a sub-carrier number and a vertical axis indicates an MSE magnitude. Although a one-time iteration is performed in accordance with the second embodiment of the present invention, as illustrated in FIG. 14, the present invention can reduce approximately half of the MSE associated with the conventional MMSE method. In accordance with the embodiment of the present invention, a curve 1420, which corresponds to two iterations, and a curve 1430, which corresponds to three iterations, overlap each other in FIG. 14.

Figure 15:
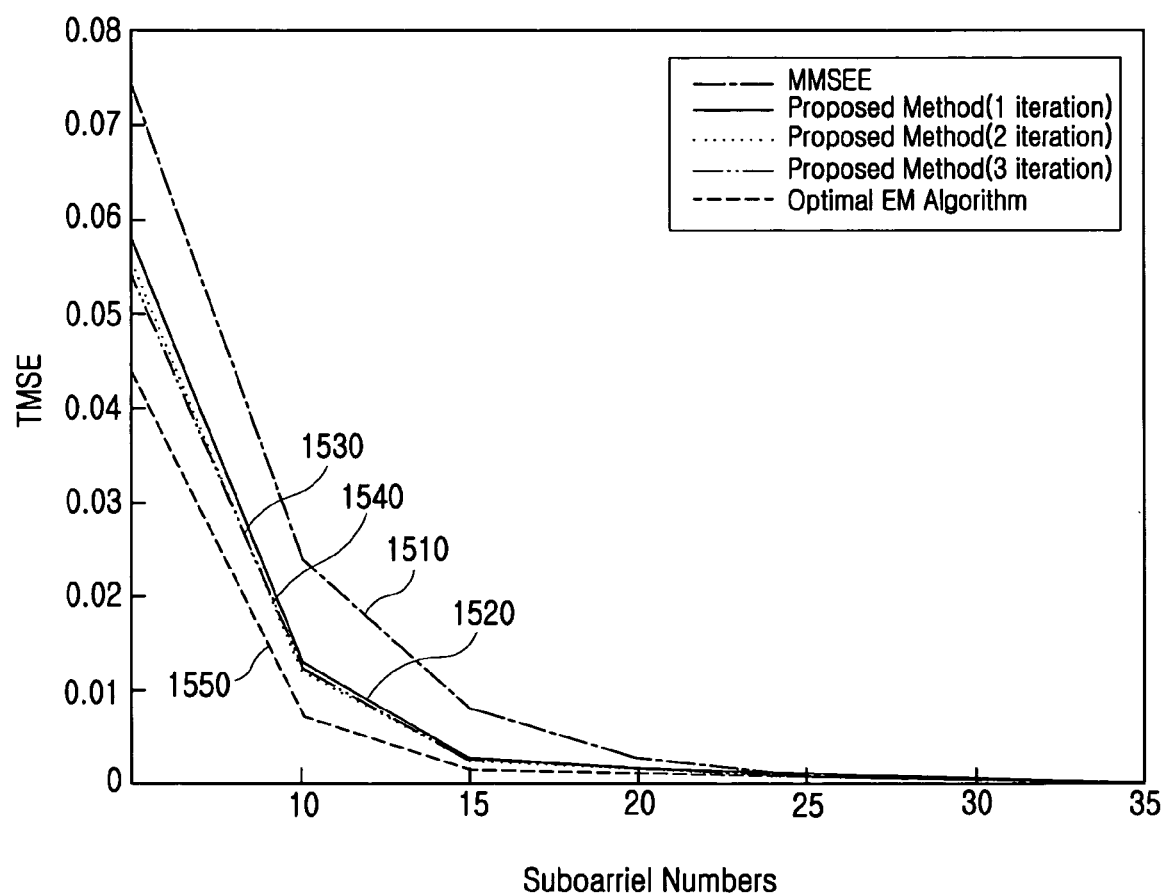
FIG. 15 is a graph illustrating an improved average MSE performance based on an iterative procedure in accordance with the second embodiment of the present invention.

FIG. 15 is a graph illustrating the improved average MSE performance based on an iterative procedure in accordance with the second embodiment of the present invention. More specifically, FIG. 15 illustrates average mean square errors (MSEs) associated with a reference numeral 1510 based on a combination-type method, reference numerals 1520, 1530, and 1540 based on the second embodiment of the present invention, and a reference numeral 1550 based on the optimal EM method, which does not limit the number of iterations, when a signal-to-noise ratio (SNR) is 10 dB. A horizontal axis indicates an SNR value and a vertical axis indicates an average MSE value of each sub-carrier. Although a one-time iteration is performed in accordance with the second embodiment of the present, as illustrated in FIG. 15, the present invention can reduce approximately half or more of an average MSE associated with the conventional MMSE method when SNR is 10 dB or more. In particular, where the SNR is greater than 20 dB, the MSE in accordance with the second embodiment of the present invention is close to the MSE 1550 based on the optimal EM method, which does not limit the number of iterations. In accordance with the second embodiment of the present invention, a curve 1520, which corresponds to two iterations, and a curve 1530, which corresponds to three iterations, overlap each other in FIG. 15.

As illustrated in FIGS. 14 and 15, the second embodiment of the present invention can obtain an SNR gain of approximately 2~3 dB in comparison with the conventional method. Thus, although transmission electric power is reduced by 30~50%, a desired BER can still be obtained. Further, where original transmission electric power is used, a radius of a cell can be extended. In accordance with the second embodiment of the present invention, the system can be easily implemented because inverse matrices consisting of rows and columns, which correspond to the number of sub-carriers, do not need to be produced every time the iteration process is performed.

As described above, the present invention provides an improved performance-based channel estimation method, compared to the conventional MMSE method, thereby obtaining a desired BER with low transmission electric power, and extending a radius of a cell.

Further, the present invention improves channel estimation performance associated with QAM signal detection in comparison with the conventional MMSE estimation method and can be easily implemented because an inverse matrix does not need to be produced.

Although preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims that follow, along with their full scope of equivalents.

What is claimed is:

1. A method for estimating a sequence of transmitted quadrature amplitude modulation (QAM)-modulated signals and space-time block coded signals using an optimal expectation-maximization (EM)-based iterative estimation algorithm in a multiple-input and multiple-output (MIMO)-orthogonal frequency division multiplexing (OFDM) mobile communication system, comprising the steps of:
   (a) producing an initial sequence estimation value according to a predetermined initial value using a pilot sub-carrier contained in each OFDM signal received by a receiving side;
   (b) producing a nonnalized value of the received signal on a channel-by-channel basis using orthogonality between the OFDM signals received by the receiving side, the normalized value of the received signal being produced by a predetermined equation;

(c) producing at least one subsequent sequence estimation value using the initial sequence estimation value and the normalized value of the received signal on the channel-by-channel basis; and (d) if the at least one subsequent sequence estimation value converges to a constant value, designating the converged subsequent sequence estimation value to be a final sequence estimation value, wherein the predetermined equation is given by:

$$z_{n,m} = H_{n,m} + W_{n,m} = Fh_{n,m} + W_{n,m}$$

where "$w_{n,m}$" denotes a white Gaussian noise of a channel from an $n^{th}$ transmitting antenna to an $m^{th}$ receiving antenna, "F" denotes a discrete Fourier transform matrix, and "$h_{n,m}$" denotes an impulse response associated with the channel from the nth transmitting antenna to the $m^{th}$ receiving antenna.

2. The method as set forth in claim 1, wherein the at least one subsequent sequence estimation value produced in step (c) is produced on according to a likelihood function produced by:

$$L(s|\hat{s}^i) = \sum_{m=1}^{M} \sum_{p=1}^{P} \left\{ \text{Re}[(y_m^p)^H C_p \Lambda_m^i f_p] - \frac{\beta_p}{2} \sum_{n=1}^{N} \sum_{a=1}^{J} \sum_{b=1}^{J} [x_{n,m}^i]_{a,b} [f_p]_a [f_p]_b^* \right\}$$

where "$\Lambda_m^i$" denotes a matrix of a conditional expected value associated with a channel impulse response and is given by $\Lambda_m^i = [\mu_{1,m}^i, \mu_{2,m}^i, \ldots, \mu_{n,m}^i]^T$, "$\mu_{n,m}^i$" denotes the conditional expected value associated with the channel impulse response and is given by $\mu_{n,m}^i = E[h_{n,m}|y_m, \hat{s}^i]$, "$[x_{n,m}^i]_{a,b}$" denotes a conditional expected value associated with a covariance matrix of the channel impulse response and is given by $[x_{n,m}^i]_{a,b} = E[h_{n,m}^a (h_{n,m}^b)^H | y_m, \hat{s}^i]$, "C" denotes a space-time block code matrix, "f" denotes an element of a discrete Fourier transform matrix, "M" denotes the number of receiving antennas, "P" denotes the number of sub-carriers, "N" denotes the number of transmitting antennas, "J" denotes the number of paths associated with the channel impulse response, and $C^H C = \beta I$.

3. The method as set forth in claim 1, wherein the white Gaussian noise is associated with the covariance matrix produced by:

$$\sigma_w^2 I = \rho \sigma_n^2 I$$

where "$\sigma_w^2$" denotes a noise variable of the channel from the $n^{th}$ transmitting antenna to the $m^{th}$ receiving antenna, "$\sigma_n^2$" denotes a noise variable of a signal received by the $m^{th}$ receiving antenna, "I" denotes an identity matrix, and "$\rho$" denotes a variance scaling factor.

4. The method as set forth in claim 3, wherein the variance scaling factor is produced by:

$$\rho = E\left[ \frac{\sum_{l=1}^{L} |c_n(l)|^2}{\beta^2} \right]$$

where "$c_n(l)$" denotes an element of a space-time block code matrix C, and $C^H C = \beta I$.

5. The method as set forth in claim 3, wherein the variance scaling factor is produced by:

| STBC | 16-QAM | 64-QAM |
| --- | --- | --- |
| Rate 1(N = 2) | 0.659 | 0.700 |
| Rate 3/4(N = 3, 4) | 0.389 | 0.398 |
| Rate 1/2(N = 3, 4) | 0.139 | 0.141. |

6. The method as set forth in claim 2, wherein the conditional expected value associated with the channel impulse response is produced by:

$$\mu_{n,m}^i = K_{n,m} F^H Z_{n,m}$$

where "$K_{n,m}$" denotes a normalized value of the covariance matrix of the channel impulse response, and "$(\cdot)^H$" denotes a Hermitian transpose operation.

7. The method as set forth in claim 2, wherein the conditional expected value associated with the covariance matrix of the channel impulse response is produced by:

$$x_{n,m}^i = \sigma_w^2 K_{n,m} + \mu_{n,m}^i (\mu_{n,m}^i)^H$$

where "$K_{n,m}$" denotes a normalized value of the covariance matrix of the channel impulse response, and "$(\cdot)^H$" denotes a Hermitian transpose operation.

8. The method as set forth in claim 6, wherein the normalized value of the covariance matrix of the channel impulse response is produced by:

$$K_{n,m} = (F^H F + \sigma_w^2 R_{n,m}^{-1})^{-1}$$

where "R" denotes the covariance matrix of the channel impulse response.

9. The method as set forth in claim 7, wherein the normalized value of the covariance matrix of the channel impulse response is produced by:

$$K_{n,m} = (F^H F + \sigma_w^2 R_{n,m}^{-})^{-1}$$

where "R" denotes the covariance matrix of the channel impulse response.

10. An apparatus for estimating a sequence of transmitted quadrature amplitude modulation (QAM)-modulated signals and space-time block coded signals using an optimal expectation-maximization (EM)-based iterative estimation algorithm in a multiple-input and multiple-output (MIMO)-orthogonal frequency division multiplexing (OFDM) mobile communication system, comprising:

a pilot detection and initial value estimation unit for producing an initial sequence estimation value according to a predetermined initial value using a pilot sub-carrier contained in each OFDM signal received by a receiving side;

a normalizer for producing a normalized value of the received signal on a channel-by-channel basis using orthogonality between the OFDM signals received by the receiving side, the normalized value of the received signal being produced by a predetermined equation; and a sequence estimator for producing at least one subsequent sequence estimation value using the initial sequence estimation value and the normalized value, and designating a converged subsequent sequence estimation value to be a final sequence estimation value if the at least one subsequent sequence estimation value converges to a constant value, wherein the predetermined equation is given by:

$$Z_{n,m} = H_{n,m} + w_{n,m} = F h_{n,m} + w_{n,m}$$

where "$w_{n,m}$" denotes a white Gaussian noise of a channel from an $n^{th}$ transmitting antenna to an $m^{th}$ receiving antenna, "F" denotes a discrete Fourier transform matrix, and "$h_{n,m}$" denotes an impulse response associated with the channel from the $n^{th}$ transmitting antenna to the $m^{th}$ receiving antenna.

11. The apparatus as set forth in claim 10, wherein the at least one subsequent sequence estimation value is produced according to a likelihood function produced by:

$$L(s|\hat{s}^i) = \sum_{m=1}^{M}\sum_{p=1}^{P}\left\{\text{Re}[(y_m^p)^H C_p \Lambda_m^i f_p] - \frac{\beta_p}{2}\sum_{n=1}^{N}\sum_{a=1}^{J}\sum_{b=1}^{J}[x_{n,m}^i]_{a,b}[f_p]_a[f_p]_b^*\right\}$$

where "$\Lambda_m^i$" denotes a matrix of a conditional expected value associated with a channel impulse response and is given by $\Lambda_m^i = [\mu_{1,m}^i, \mu_{2,m}^i, \ldots, \mu_{n,m}^i]^T$, "$\mu_{n,m}^i$" denotes the conditional expected value associated with the channel impulse response and is given by $\mu_{n,m}^i = E[h_{n,m}|y_m,\hat{s}^i]$, "$\lfloor x_{n,m}^i \exists_{a,b}$" denotes a conditional expected value associated with a covariance matrix of the channel impulse response and is given by $[x_{n,m}^i]_{a,b} = E[h_{n,m}^a (h_{n,m}^b)^H|y_m,\hat{s}^i]$, "C" denotes a space-time block code matrix, "f" denotes an element of a discrete Fourier transform matrix, "M" denotes the number of receiving antennas, "P" denotes the number of sub-carriers, "N" denotes the number of transmitting $C^H C = \beta I$.

12. The apparatus as set forth in claim 10, wherein the white Gaussian noise is associated with the covariance matrix produced by:

$$\sigma_w^2 I = \rho \sigma_n^2 I$$

where "$\sigma_w^2$" denotes a noise variable of a channel from the $n^{th}$ transmitting antenna to the $m^{th}$ receiving antenna, "$\sigma_n^2$" denotes a noise variable of a signal received by the $m^{th}$ receiving antenna, "I" denotes an identity matrix, and "$\rho$" denotes a variance scaling factor.

13. The apparatus as set forth in claim 12, wherein the variance scaling factor is produced by:

$$\rho = E\left[\frac{\sum_{l=1}^{L}|c_n(l)|^2}{\beta^2}\right]$$

where "$c_n(l)$" denotes an element of a space-time block code matrix C, and $C^H C = \beta I$.

14. The apparatus as set forth in claim 12, wherein the variance scaling factor is produced by:

| STBC | 16-QAM | 64-QAM |
| --- | --- | --- |
| Rate 1(N = 2) | 0.659 | 0.700 |
| Rate 3/4(N = 3, 4) | 0.389 | 0.398 |
| Rate 1/2(N = 3, 4) | 0.139 | 0.141. |

15. The apparatus as set forth in claim 11, wherein the conditional expected value associated with the channel impulse response is produced by:

$$\mu_{n,m}^i = K_{n,m} F^H z_{n,m}$$

where "$K_{n,m}$" denotes a normalized value of the covariance matrix of the channel impulse response, and "$(\cdot)^H$" denotes a Hermitian transpose operation.

16. The apparatus as set forth in claim 11, wherein the conditional expected value associated with the covariance matrix of the channel impulse response is produced by:

$$x_{n,m}^i = \sigma_w^2 K_{n,m} = \mu_{n,m}^i (\mu_{n,m}^i)^H$$

where "$K_{n,m}$" denotes a normalized value of the covariance matrix of the channel impulse response, and "$(\cdot)^H$" denotes a Hermitian transpose operation.

17. The apparatus as set forth in claim 15, wherein the normalized value of the covariance matrix of the channel impulse response is produced by:

$$K_{n,m} = (F^H F + \sigma_w^2 R_{n,m}^{-1})^{-1}$$

where "R" denotes the covariance matrix of the channel impulse response.

18. The apparatus as set forth in claim 16, wherein the normalized value of the covariance matrix of the channel impulse response is produced by:

$$K_{n,m} = (F^H F + \sigma_w^2 R_{n,m}^{-1})^{-1}$$

where "R" denotes the covariance matrix of the channel impulse response.

19. A method for estimating a sequence of transmitted quadrature amplitude modulation (QAM)-modulated signals though an optimal expectation-maximization (EM)-based iterative estimation algorithm using one receiving antenna of a multiple-input and multiple-output (MIMO) orthogonal frequency division multiplexing (OFDM) mobile communication system, comprising the steps of:

(a) producing an initial sequence estimation value according to a predetermined initial value using a pilot sub-carrier contained in each OFDM signal received by the receiving antenna;

(b) producing a normalized value of the received signal using the initial sequence estimation value, the normalized value of the received signal being produced by a predetermined equation;

(c) producing at least one subsequent sequence estimation value using the initial sequence estimation value and the normalized value of the received signal; and (d) if the at least one subsequent sequence estimation value converges to a constant value, designating the converged subsequent sequence estimation value to be a final sequence estimation value, wherein the predetermined equation is given by:

$$y' = (s^i)^{-1} y = Fh + n'$$

where "F" denotes a discrete Fourier transform matrix, "h" denotes a channel impulse response, and "n" denotes a channel white Gaussian noise.

20. The method as set forth in claim 19, wherein the at least one subsequent sequence estimation value produced step (c) is produced according to a likelihood function produced by:

$$Q(s|s^i) = \sum_{k=-N_a}^{N_a}\left\{\text{Re}\left[y^*(k)s(k)\sum_{l=1}^{L}[F]_{k,l}m_1^i(l)\right] - \frac{1}{2}|s_k|^2\sum_{l=1}^{L}\sum_{m=1}^{L}[F]_{k,l}[F]_{k,m}^* m_2^i(l,m)\right\}$$

where "F" denotes a discrete Fourier transform matrix, "$m_1^i$" denotes a conditional expected value associated with the channel impulse response, "$m_2^i$" denotes a conditional expected value associated with a covariance matrix of the channel impulse response, and "L" denotes a number of channels.

21. The method as set forth in claim 19, wherein the white Gaussian noise is produced by:

$$\sigma_{n'}^2 = \frac{1}{M} \sum_{m=1}^{M} \frac{\sigma_n^2}{|s_m|^2} = \beta \sigma_n^2$$

where "$S_m$" denotes an $m^{th}$ symbol based on M-ary QAM, "$\beta$" denotes a variance scaling factor, and "$\sigma_n^2$" denotes a noise variable.

22. The method as set forth in claim 21, wherein the variance scaling factor is $\beta=1.998$ for 16-QAM.

23. The method as set forth in claim 21, wherein the variance scaling factor is $\beta=2.6854$ for 64-QAM.

24. The method as set forth in claim 20, wherein the conditional expected value associated with the channel impulse response is produced by:

$$m_1^i = [m_1^i(1), m_1^i(2), \ldots, m_1^i(L)]^T = E[h|y, s^i] = (R')^i F^H y$$

where "$(\cdot)^H$" denotes a Hermitian transpose operation, and "R'" denotes a normalized value of a covariance matrix of the channel impulse response.

25. The method as set forth in claim 20, wherein a normalized value of the covariance matrix of the channel impulse response is produced by:

$$m_2^i = \begin{bmatrix} m_2^i(1,1) & m_2^i(1,2) & \cdots & m_2^i(1,L) \\ m_2^i(2,1) & m_2^i(2,2) & \cdots & m_2^i(2,L) \\ & & \cdots & \\ m_2^i(L,1) & m_2^i(L,1) & \cdots & m_2^i(L,L) \end{bmatrix}$$
$$= E[hh^H | y, s^i]$$
$$= \sigma_n^2 (R')^i + m_1^i (m_1^i)^H$$

where "$(\cdot)^H$" denotes a Hermitian transpose operation, and "R'" denotes a normalized value of the covariance matrix of the channel impulse response.

26. The method as set forth in claim 24, wherein the normalized value of the covariance matrix of the channel impulse response is produced by:

$$(R')^i = [\sigma_n^2 R_h^{-1} + F^H F]^{-1}$$

where "$R_h$" denotes the covariance matrix of the channel impulse response.

27. The method as set forth in claim 25, wherein the normalized value of the covariance matrix of the channel impulse response is produced by:

$$(R')^i = [\sigma_n^2 R_h^{-1} + F^H F]^{-1}$$

where "$R_h$" denotes the covariance matrix of the channel impulse response.

28. An apparatus for estimating a sequence of transmitted quadrature amplitude modulation (QAM)-modulated signals though an optimal expectation-maximization (EM)-based iterative estimation algorithm using one receiving antenna of a multiple-input and multiple-output (MIMO) orthogonal frequency division multiplexing (OFDM) mobile communication system, comprising:

a pilot detection and initial value estimation unit for producing an initial sequence estimation value according to a predetermined initial value using a pilot sub-carrier contained in each OFDM signal received by a receiving side;

a normalizer for producing a normalized value of the received signal using the initial sequence estimation value, the normalized value of the received signal being produced by a predetermined equation; and a sequence estimator for producing at least one subsequent sequence estimation value using the initial sequence estimation value and the normalized value, and designating a converged subsequent sequence estimation value to be a final sequence estimation value if the at least one subsequent sequence estimation value converges to a constant value, wherein the predetermined equation is:

$$y' = (s^i)^{-1} y = Fh + n'$$

where "F" denotes a discrete Fourier transform matrix, "h" denotes a channel impulse response, and "n" denotes a channel white Gaussian noise.

29. The apparatus as set forth in claim 28, wherein the at least one subsequent sequence estimation value is produced according to a likelihood function produced by:

$$Q(s|s^i) = \sum_{k=-N_a}^{N_a} \left\{ \text{Re}\left[ y^*(k)s(k) \sum_{l=1}^{L} [F]_{k,l} m_1^i(l) \right] - \frac{1}{2}|s_k|^2 \sum_{l=1}^{L} \sum_{m=1}^{L} [F]_{k,l} [F]_{k,m}^* m_2^i(l,m) \right\}$$

where "F" denotes the discrete Fourier transform matrix, "$m_1^i$" denotes a conditional expected value associated with the channel impulse response, "$m_2^i$" denotes a conditional expected value associated with a covariance matrix of the channel impulse response, and "L" denotes the number of channels.

30. The apparatus as set forth in claim 28, wherein the white Gaussian noise is produced by:

$$\sigma_{n'}^2 = \frac{1}{M} \sum_{m=1}^{M} \frac{\sigma_n^2}{|s_m|^2} = \beta \sigma_n^2$$

where "$s_m$" denotes an $m^{th}$ symbol based on M-ary QAM, "$\beta$" denotes a variance scaling factor, and "$\sigma_n^2$" denotes a noise variable.

31. The apparatus as set forth in claim 30, wherein the variance scaling factor is $\beta=1.998$ for 16-QAM.

32. The apparatus as set forth in claim 30, wherein the variance scaling factor is $\beta=2.6854$ for 64-QAM.

33. The apparatus as set forth in claim 29, wherein the conditional expected value associated with the channel impulse response is produced by:

$$m_1^i = [m_1^i(1), m_1^i(2), \ldots, m_1^i(L)]^T = E[h|y, s^i] = (R')^i F^H y$$

where "$(\cdot)^H$" denotes a Hermitian transpose operation, and "R'" denotes a normalized value of the covariance matrix of the channel impulse response.

34. The apparatus as set forth in claim 29, wherein a normalized value of the covariance matrix of the channel impulse response is produced by an equation of:

$$m_2^i = \begin{bmatrix} m_2^i(1,1) & m_2^i(1,2) & \ldots & m_2^i(1,L) \\ m_2^i(2,1) & m_2^i(2,2) & \ldots & m_2^i(2,L) \\ & & \ldots & \\ m_2^i(L,1) & m_2^i(L,2) & \ldots & m_2^i(L,L) \end{bmatrix} =$$

$$E[hh^H \mid y, s^i] = \sigma_n^2 (R')^i + m_1^i (m_1^i)^H$$

where "$(\cdot)^H$" denotes a Hermitian transpose operation, and "R'" denotes a normalized value of the covariance matrix of the channel impulse response.

35. The apparatus as set forth in claim 33, wherein a normalized value of the covariance matrix of the channel impulse response is produced by an equation of:

$$(R')^i = [\sigma_n^2 R_h^{-1} + F^H F]^{-1}$$

where "$R_h$" denotes the covariance matrix of the channel impulse response.

36. The apparatus as set forth in claim 34, wherein the normalized value of the covariance matrix of the channel impulse response is produced by:

$$(R')^i = [\sigma_n^2 R_h^{-1} + F^H F]^{-1}$$

where "$R_h$" denotes the covariance matrix of the channel impulse response.

* * * * *